(12) United States Patent
He et al.

(10) Patent No.: US 11,006,348 B2
(45) Date of Patent: May 11, 2021

(54) SYSTEM INFORMATION TRANSMISSION METHOD, USER EQUIPMENT, NETWORK SIDE DEVICE, SYSTEM AND STORAGE MEDIUM

(71) Applicant: CHINA ACADEMY OF TELECOMMUNICATIONS TECHNOLOGY, Beijing (CN)

(72) Inventors: Yuan He, Beijing (CN); Wei Bao, Beijing (CN); Pierre Bertrand, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/319,820

(22) PCT Filed: Jul. 5, 2017

(86) PCT No.: PCT/CN2017/091784
§ 371 (c)(1),
(2) Date: Jan. 22, 2019

(87) PCT Pub. No.: WO2018/014728
PCT Pub. Date: Jan. 25, 2018

(65) Prior Publication Data
US 2019/0223082 A1 Jul. 18, 2019

(30) Foreign Application Priority Data

Jul. 22, 2016 (CN) .......................... 201610586055.4

(51) Int. Cl.
*H04W 48/10* (2009.01)
*H04W 48/14* (2009.01)
(Continued)

(52) U.S. Cl.
CPC ......... *H04W 48/10* (2013.01); *H04L 12/1868* (2013.01); *H04W 4/06* (2013.01); *H04W 48/14* (2013.01)

(58) Field of Classification Search
CPC .................................................... H04W 48/10
See application file for complete search history.

(56) References Cited

U.S. PATENT DOCUMENTS 6,567,660 B1 * 5/2003 Wegener ............... H04H 20/42
455/3.01
7,320,025 B1 * 1/2008 Steinberg ............... H04N 7/173
709/217
(Continued)

FOREIGN PATENT DOCUMENTS

CN 101128031 A 2/2008
CN 101873568 A 10/2010
(Continued)

OTHER PUBLICATIONS

Notice of Reasons for Refusal, Application number Japanese Patent Application No. 2019-503291, Date of Drafting: Reiwa 1(2019) Dec. 24, Noriyuki 3665 5J00, Representative/Applicant: Fujita, Kazuko, Applied Provisions: The first item of Article 29, Article 29(2).

(Continued)

*Primary Examiner* — Raj Jain
*Assistant Examiner* — Andrew C Lee
(74) *Attorney, Agent, or Firm* — Flener IP & Business Law; Zareefa B. Flener

(57) ABSTRACT

A transmission method of system information, a user equipment, a network side device, a system and a storage medium are provided. The method includes: receiving, by the UE, system information sent by a network side device, the system information is part of system information of the network side device; sending, by the UE, a request message
(Continued)

to the network side device, wherein the request message is used to request the system information required by the UE; receiving by the UE, the system information required by the UE in on-demand system information sent by the network side device, wherein the on-demand system information is another part of system information of the network side device other than the part of system information of the network side device.

12 Claims, 11 Drawing Sheets

(51) Int. Cl.
*H04W 4/06* (2009.01)
*H04L 12/18* (2006.01)

(56) References Cited

U.S. PATENT DOCUMENTS

| | | | | |
|---|---|---|---|---|
| 10,187,848 | B2* | 1/2019 | Mustapha | H04W 48/14 |
| 2003/0229898 | A1* | 12/2003 | Babu | H04N 21/4667 725/87 |
| 2012/0101985 | A1* | 4/2012 | Kemp | G06F 16/9535 707/609 |
| 2015/0249952 | A1 | 9/2015 | Lee et al. | |
| 2015/0256995 | A1 | 9/2015 | Rune et al. | |
| 2015/0382284 | A1* | 12/2015 | Brismar | H04W 48/12 370/329 |
| 2016/0128006 | A1* | 5/2016 | Ji | H04W 72/04 370/350 |
| 2016/0234735 | A1* | 8/2016 | Kubota | H04W 48/14 |
| 2016/0234736 | A1 | 8/2016 | Kubota et al. | |
| 2016/0234759 | A1* | 8/2016 | Kubota | H04W 48/10 |
| 2016/0270013 | A1* | 9/2016 | Soriaga | H04W 56/001 |
| 2016/0294759 | A1* | 10/2016 | Huang | H04L 51/063 |
| 2017/0220966 | A1* | 8/2017 | Wang | G06Q 50/30 |
| 2017/0311285 | A1* | 10/2017 | Ly | H04W 74/0833 |

FOREIGN PATENT DOCUMENTS

| | | |
|---|---|---|
| CN | 103856923 A | 6/2014 |
| CN | 106375965 A | 2/2017 |
| TW | 201640934 A | 11/2016 |
| WO | 2008044664 A1 | 4/2008 |
| WO | 2014/129951 A | 8/2014 |
| WO | 2014129951 A1 | 8/2014 |
| WO | 2015154248 A1 | 10/2015 |
| WO | 2016/130353 A2 | 8/2016 |

OTHER PUBLICATIONS

Supplementary European Search Report, Communication, Reference: A2016/09051-EP, dated May 31, 2019, Patent No. PCT/CN2017091784, Applicant: China Academy of Telecommunications Technology.
R2-163586, 3GPP TSG-RAN WG2 Meeting #94, Nanjing, China, May 23-27, 2016, Agenda Item: 9.4.3.2.3, Source: Intel Corporation, Title: System Information for Standalone NR Deployment, Document for: Discussion and Decision.
Patent Cooperation Treaty, Written Opinion of the International Searching Authority, dated Aug. 30, 2017, International Application No. PCT/CN2017/091784, Applicant: China Academy of Telecommunications Technology.
First Office Action, The State Intellectual Property Office of People's Republic of China, Applicant or Patentee: China Academy of Telecommunications Technology, Title of Invention: System Information Transmission Method and System, User Terminal and Network Side Device, Publication Date: Feb. 20, 2008.
R2-163371, 3GPP TSG-RAN WG2 Meeting #94, Nanjing, China, May 23-27, 2016, Agenda Item: 9.4.32.3, Source: Samsung, Title: System Informaiton Signalling Design in NR, Document for: Discussion & Decision.

* cited by examiner

US 11,006,348 B2

SYSTEM INFORMATION TRANSMISSION METHOD, USER EQUIPMENT, NETWORK SIDE DEVICE, SYSTEM AND STORAGE MEDIUM

CROSS-REFERENCE TO RELATED APPLICATION

The present application claims a priority of the Chinese patent application No. 201610586055.4 filed on Jul. 22, 2016, which is incorporated herein by reference in its entirety.

TECHNICAL FIELD

The present disclosure relates to the field of communication technology, in particular to a system information transmission method, a user equipment, a network side device, a system and a storage medium.

BACKGROUND

The system information (SI) of a wireless communication system is mainly divided into a master information block (MIB) and a plurality of system information blocks (SIBs). The system information blocks may include SIB1-SIB20. In practical applications, system information is required to be broadcasted in many scenarios. For example, when a UE newly accesses a cell or a broadcast message changes, system information is broadcasted. At present, all system information are broadcasted each time, that is, system information including MIB, SIB1, and SI, where SI includes SIB2-SIB20. Of course, the system information may include more information. Since the system information in the wireless communication system is periodically broadcasted, the content of the system information will be more and more as the service of the wireless communication system is diversified and the terminal type is continuously evolved. The overhead of the system information will be larger and larger. Therefore, there is a problem of excessive overhead of system information in wireless communication systems.

SUMMARY

An object of the present disclosure is to provide a system information transmission method, a user equipment, a network side device, a system and a storage medium, so as to solve the problem of excessive overhead of system information in wireless communication systems.

In order to solve the above problem, the present disclosure provides in some embodiments a transmission method of system information, including: receiving, by a user equipment (UE), system information sent by a network side device, wherein the system information is part of system information of the network side device; sending, by the UE, a request message to the network side device, wherein the request message is used to request the system information required by the UE; and receiving by the UE, the system information required by the UE in on-demand system information sent by the network side device, wherein the on-demand system information is another part of system information of the network side device other than the part of system information of the network side device.

In some embodiments, the system information required by UE is part or all of system information indicated in an information indication list acquired by the UE, and the information indication list is an indication list of the on-demand system information.

In some embodiments, the receiving, by the UE, system information sent by a network side device includes: receiving, by the UE, a system message that is sent by the network side device and includes the system information, wherein the system message further includes the information indication list.

In some embodiments, the receiving, by the UE, system information sent by a network side device includes: receiving, by the UE, a system message that is sent by the network side device and includes the system information, and the system message further includes indication information about whether the network side device has the on-demand system information.

In some embodiments, the method further includes: if the indication information indicates that the network side device has the on-demand system information, sending, by the UE, a request message for obtaining an information request list to the network side device; and receiving, by the UE, the information indication list sent by the network side device.

In some embodiments, the method further includes: if the indication information indicates that the network side device has the on-demand system information, determining system information other than the system information included in the system message as the on-demand system information, wherein the information indication list is an indication list of the determined on-demand system information.

In some embodiments, the receiving, by the UE, system information sent by a network side device includes: receiving, by the UE, a system message that is sent by the network side device and includes the system information, wherein the system message further includes indication information about whether the network side device has the on-demand system information; wherein the method further comprises: if the indication information indicates that the network side device has the on-demand system information, determining system information other than the system information included in the system message as the on-demand system information; and wherein the system information required by the UE is part or all of system information of the determined on-demand system information.

In some embodiments, the receiving by the UE, the system information required by the UE in on-demand system information sent by the network side device includes: receiving, by the UE, a response message sent by the network side, wherein the response message includes all system information required by the UE in the on-demand system information; or receiving, by the UE, a response message sent by the network side, wherein the response message includes part of system information required by the UE in the on-demand system information and indication information indicating that the other part of system information required by the UE cannot be provided; or receiving, by the UE, a response message sent by the network side in a multicast way, wherein the response message includes all system information required by the UE in the on-demand system information, and all system information required by other UEs in the on-demand system information; or receiving, by the UE, a response message sent by the network side in a multicast way, wherein the response message includes system information required by the UE in the on-demand system information, system information required by other UEs in the on-demand system information, and indication information indicating that part of system information cannot be provided, wherein the part of system information is part of system information requested by the request message and/or requested by the other UEs; or receiving, by the UE, a response message sent by the network side in a multicast way, wherein the response message includes all system information required by the UE in the on-demand system information, and a failure indication information indicating that system information required by other UEs cannot be provided.

In some embodiments, the receiving by the UE, the system information required by the UE in on-demand system information sent by the network side device includes: receiving, by the UE, the system information required by the UE in the on-demand system information sent by the network side when the on-demand system information of the network side device includes the system information required by the UE; and wherein the method further includes: receiving, by the UE, a system information acquisition failure message sent by the network side device when the on-demand system information of the network side device does not include the system information required by the UE.

In some embodiments, the receiving by the UE, the system information required by the UE in on-demand system information sent by the network side device includes: receiving, by the UE, a response message sent by the network side, wherein the response message includes system information required by the UE in the on-demand system information and a system information value tag (systemInfoValueTag); and wherein the method further includes: determining, by the UE, whether the systemInfoValueTag is consistent with systemInfoValueTag when the request message is sent, if yes, determine that the system information required by the UE sent by the network side device is valid, if not, determine the system information required by the UE sent by the network side device is invalid.

In some embodiments, the method further includes: obtaining, by the UE, systemInfoValueTag, wherein the systemInfoValueTag is a systemInfoValueTag in a system message broadcasted periodically by the network side device when the UE receives the system information required by the UE sent by the network side device; and determining, by the UE, whether the systemInfoValueTag is consistent with systemInfoValueTag when the request message is sent, if yes, determine that the system information required by the UE sent by the network side device is valid, if not, determine the system information required by the UE sent by the network side device is invalid.

In some embodiments, the request message indicates the system information required by the UE by using a bitmap; or the request message indicates the system information required by the UE by an index.

In some embodiments, the sending, by the UE, a request message to the network side device includes: sending, by the UE, the request message to the network side device in a random access procedure; and the receiving by the UE, the system information required by the UE in on-demand system information sent by the network side device includes: receiving, by the UE, system information required by the UE in the on-demand system information sent by the network side device in the random access procedure.

In some embodiments, the sending, by the UE, a request message to the network side device includes: sending, by the UE, an uplink signal to the network side device, wherein the uplink signal corresponds to system information required by the UE, so that the network side device determines the system information required by the UE by using the uplink signal.

In some embodiments, the method further includes: receiving, by the UE, mapping relationship information between the uplink signal and the system information sent by the network side device.

In some embodiments, the sending, by the UE, a request message to the network side device includes: sending, by the UE, the request message to the network side device by using a radio resource control message; or sending, by the UE, the request message to the network side device by using a MAC control element.

In some embodiments, a transmission method of system information includes: sending, by a network side device, system information to a user equipment (UE), wherein the system information is part of system information of the network side device; receiving, by the network side device, a request message sent by the UE, wherein the request message is used to request system information required by the UE; and sending, by the network side device, the system information required by the UE in on-demand system information to the UE, wherein the on-demand system information is another part of system information other than the part of system information of the network side device.

In some embodiments, the system information required by the UE is part or all of the system information indicated in an information indication list acquired by the UE, and the information indication list is an indication list of the on-demand system information.

In some embodiments, the sending, by the network side device, system information to the UE includes: sending, by the network side device, a system message that includes system information to the UE, wherein the system message further includes the information indication list.

In some embodiments, the sending, by the network side device, system information to the UE includes: sending, by the network side device, a system message that includes system information to the UE, wherein the system message further includes indication information indicating whether the network side device has the on-demand system information.

In some embodiments, the method further includes: if the indication information indicates that the network side device has the on-demand system information, receiving, by the network side device, a request message for obtaining the information indication list sent by the UE; and sending, by the network side device, the information indication list to the UE.

In some embodiments, if the indication information indicates that the network side device has the on-demand system information, so that the UE determines system information other than the system information included in the system message as the on-demand system information; and wherein the information indication list is an indication list of the determined on-demand system information.

In some embodiments, the sending, by the network side device, system information to the UE includes: sending, by the network side device, a system message that includes system information to the UE, wherein the system message further includes indication information indicating whether the network side device has the on-demand system information, if the indication information indicates the network side device has the on-demand system information, determine, by the UE, system information other than the system information included in the system message as the on-demand system information; and wherein the system information required by the UE is part or all of system information of the determined on-demand system information.

In some embodiments, the sending, by the network side device, the system information required by the UE in the on-demand system information to the UE includes: sending, by the network side device, a response message to the UE, the response message includes all system information required by the UE in the on-demand system information; or sending, by the network side device, a response message to the UE, the response message includes part of system information required by the UE in the on-demand system information, and indication information indicating that the other part of system information required by the UE cannot be provided; or sending, by the network side device, a response message to the UE in a multicast way, the response message includes all system information required by the UE in the on-demand system information, and all system information required by other UEs in the on-demand system information; or sending, by the network side device, a response message to the UE by using a multicast way, the response message includes system information required by the UE in the on-demand system information, the system information required by other UEs in the on-demand system information, and indication information indicating that part of system information cannot be provided, wherein the part of system information is part of system information requested by the request message and/or requested by the other UE; or sending, by the network side device, a response message to the UE in a multicast way, the response message includes all system information required by the UE in the on-demand system information, and a failure indication message indicating that system information required by other UEs cannot be provided.

In some embodiments, the sending, by the network side device, the system information required by the UE in the on-demand system information to the UE includes: sending, by the network side device, system information required by the UE in the on-demand system information to the UE when the on-demand system information of the network side device includes the system information required by the UE; and wherein the method further includes: sending, by the network side device, an acquisition failure message of the system information to the UE when the system information of the network side device does not include the system information required by the UE.

In some embodiments, the sending, by the network side device, the system information required by the UE in the on-demand system information to the UE includes: sending, by the network side device, a response message to the UE, the response message includes system information required by the UE in the on-demand system information and a system information value tag (systemInfoValueTag), so that the UE determines whether the systemInfoValueTag and systemInfoValueTag when sending the request message is consistent, if yes, determine that the system information required by the UE sent by the network side device is valid, and if not, determine that the system information required by the UE sent by the network side device is invalid.

In some embodiments, the method further includes: broadcasting, by the network side device, a system message when the system information required by the UE is sent to the UE, wherein the system message includes a systemInfoValueTag, so that the UE determines whether the systemInfoValueTag and systemInfoValueTag when sending the request message is consistent, if yes, determine that the system information required by the UE sent by the network side device is valid, and if not, determine that the system information required by the UE sent by the network side device is invalid.

In some embodiments, the request message indicates system information required by the UE by using a bitmap; or the request message indicates the system information required by the UE by an index.

In some embodiments, the receiving, by the network side device, a request message sent by the UE includes: receiving, by the network side device, the request message sent by the UE in a random access procedure; and the sending, by the network side device, the system information required by the UE in the on-demand system information to the UE includes: sending, by the network side device, system information required by the UE in the on-demand system information to the UE in the random access procedure.

In some embodiments, the receiving, by the network side device, a request message sent by the UE includes: receiving, by the network side device, an uplink signal sent by the UE, the uplink signal corresponds to system information required by the UE; and wherein the method further includes: determining, by the network side device, system information required by the UE by using the uplink signal.

In some embodiments, the method further includes: sending, by the network side device, mapping relationship information between the uplink signal and the system information to the UE.

In some embodiments, the receiving, by the network side device, a request message sent by the UE includes: receiving, by the network side device, the request message sent by the UE by using a radio resource control message; or receiving, by the network side device, the request message sent by the UE by using a MAC control element.

In another aspect, a user equipment (UE), includes: a first receiving module, configured to receive system information sent by a network side device, wherein the system information is part of system information of the network side device; a first sending module, configured to send a request message to the network side device, wherein the request message is used to request the system information required by the UE; and a second receiving module, configured to receive the system information required by the UE in on-demand system information sent by the network side device, wherein the on-demand system information is another part of system information of the network side device other than the part of system information of the network side device.

In some embodiments, the system information required by UE is part or all of system information indicated in an information indication list acquired by the UE, and the information indication list is an indication list of the on-demand system information.

In some embodiments, the first receiving module is configured to receive a system message that is sent by the network side device and includes the system information, where the system message further includes the information indication list.

In some embodiments, the first receiving module is configured to receive a system message that is sent by the network side device and includes the system information, and the system message further includes indication information about whether the network side device has the on-demand system information.

In some embodiments, the UE further includes: a second sending module, configured to, if the indication information indicates that the network side device has the on-demand system information, send a request message for obtaining an information request list to the network side device; and a third receiving module, configured to receive the information indication list sent by the network side device.

In some embodiments, the UE further includes: a first determining module, configured to, if the indication information indicates that the network side device has the on-demand system information, determine system information other than the system information included in the system message as the on-demand system information, wherein the information indication list is an indication list of the determined on-demand system information.

In some embodiments, the first receiving module is configured to receive a system message that is sent by the network side device and includes the system information, wherein the system message further includes indication information about whether the network side device has the on-demand system information; wherein the UE further includes: a second determining module, configured to, if the indication information indicates that the network side device has the on-demand system information, determine system information other than the system information included in the system message as the on-demand system information; and wherein the system information required by the UE is part or all of system information of the determined on-demand system information.

In some embodiments, the second receiving module is configured to receive a response message sent by the network side, wherein the response message includes all system information required by the UE in the on-demand system information; or the second receiving module is configured to receive a response message sent by the network side, wherein the response message includes part of system information required by the UE in the on-demand system information and indication information indicating that the other part of system information required by the UE cannot be provided; or the second receiving module is configured to receive a response message sent by the network side in a multicast way, wherein the response message includes all system information required by the UE in the on-demand system information, and all system information required by other UEs in the on-demand system information; or the second receiving module is configured to receive a response message sent by the network side in a multicast way, where the response message includes system information required by the UE in the on-demand system information, system information required by other UEs in the on-demand system information, and indication information indicating that part of system information cannot be provided, wherein the part of system information is part of system information requested by the request message and/or requested by the other UEs; or the second receiving module is configured to receive a response message sent by the network side in a multicast way, wherein the response message includes all system information required by the UE in the on-demand system information, and a failure indication information indicating that system information required by other UEs cannot be provided.

In some embodiments, the second receiving module is configured to receive the system information required by the UE in the on-demand system information sent by the network side when the on-demand system information of the network side device includes the system information required by the UE; wherein the UE further includes: a fourth receiving module, configured to receive a system information acquisition failure message sent by the network side device when the on-demand system information of the network side device does not include the system information required by the UE.

In some embodiments, the second receiving module is configured to receive a response message sent by the network side, wherein the response message includes system information required by the UE in the on-demand system information and a system information value tag (systemInfoValueTag); wherein the UE further includes: a first determining module, configured to determine whether the systemInfoValueTag is consistent with systemInfoValueTag when the request message is sent, if yes, determine that the system information required by the UE sent by the network side device is valid, if not, determine the system information required by the UE sent by the network side device is invalid.

In some embodiments, the UE further includes: an obtaining module, configured to obtain systemInfoValueTag, wherein the systemInfoValueTag is a systemInfoValueTag in a system message broadcasted periodically by the network side device when the UE receives the system information required by the UE sent by the network side device; and a second determining module, configured to determine whether the systemInfoValueTag is consistent with systemInfoValueTag when the request message is sent, if yes, determine that the system information required by the UE sent by the network side device is valid, if not, determine the system information required by the UE sent by the network side device is invalid.

In some embodiments, the request message indicates the system information required by the UE by using a bitmap; or the request message indicates the system information required by the UE by an index.

In some embodiments, the first sending module is configured to send the request message to the network side device in a random access procedure; and the second receiving module is configured to receive system information required by the UE in the on-demand system information sent by the network side device in the random access procedure.

In some embodiments, the first sending module is configured to send an uplink signal to the network side device, wherein the uplink signal corresponds to system information required by the UE, so that the network side device determines the system information required by the UE by using the uplink signal.

In some embodiments, the UE further includes: a fifth receiving module, configured to receive mapping relationship information between the uplink signal and the system information sent by the network side device.

In some embodiments, the first sending module is configured to send the request message to the network side device by using a radio resource control message; or the first sending module is configured to send the request message to the network side device by using a MAC control element.

In yet another aspect, a network side device, includes: a first sending module, configured to send system information to a user equipment (UE), wherein the system information is part of system information of the network side device; a first receiving module, configured to receive a request message sent by the UE, wherein the request message is used to request system information required by the UE; and a second sending module, configured to send the system information required by the UE in on-demand system information to the UE, wherein the on-demand system information is another part of system information other than the part of system information of the network side device.

In some embodiments, the system information required by the UE is part or all of the system information indicated in an information indication list acquired by the UE, and the information indication list is an indication list of the on-demand system information.

In some embodiments, the first sending module is configured to send a system message that includes system information to the UE, wherein the system message further includes an information indication list.

In some embodiments, the first sending module is configured to send a system message that includes system information to the UE, wherein the system message further includes indication information indicating whether the network side device has the on-demand system information.

In some embodiments, the network side device further includes: a second receiving module, configured to, if the indication information indicates that the network side device has the on-demand system information, receive a request message for obtaining an information indication list sent by the UE; and a third sending module, configured to send the information indication list to the UE.

In some embodiments, if the indication information indicates that the network side device has the on-demand system information, so that the UE determines system information other than the system information included in the system message as the on-demand system information; and wherein an information indication list is an indication list of the determined on-demand system information.

In some embodiments, the first sending module is configured to send a system message that includes system information to the UE, wherein the system message further includes indication information indicating whether the network side device has the on-demand system information, if the indication information indicates the network side device has the on-demand system information, determine, by the UE, system information other than the system information included in the system message as the on-demand system information; and wherein the system information required by the UE is part or all of system information of the determined on-demand system information.

In some embodiments, the second sending module is configured to send a response message to the UE, the response message includes all system information required by the UE in the on-demand system information; or the second sending module is configured to send a response message to the UE, the response message includes part of system information required by the UE in the on-demand system information, and indication information indicating that the other part of system information required by the UE cannot be provided; or the second sending module is configured to send a response message to the UE in a multicast way, the response message includes all system information required by the UE in the on-demand system information, and all system information required by other UEs in the on-demand system information; or the second sending module is configured to send a response message to the UE by using a multicast way, the response message includes system information required by the UE in the on-demand system information, the system information required by other UEs in the on-demand system information, and indication information indicating that part of system information cannot be provided, wherein the part of system information is part of system information requested by the request message and/or requested by the other UE; or the second sending module is configured to send a response message to the UE in a multicast way, the response message includes all system information required by the UE in the on-demand system information, and a failure indication message indicating that system information required by other UEs cannot be provided.

In some embodiments, the second sending module is configured to send system information required by the UE in the on-demand system information to the UE when the on-demand system information of the network side device includes the system information required by the UE; wherein the network side device further includes: a fourth sending module, configured to send an acquisition failure message of the system information to the UE when the system information of the network side device does not include the system information required by the UE.

In some embodiments, the second sending module is configured to send a response message to the UE, the response message includes system information required by the UE in the on-demand system information and a system information value tag (systemInfoValueTag), so that the UE determines whether the systemInfoValueTag and systemInfoValueTag when sending the request message is consistent, if yes, determine that the system information required by the UE sent by the network side device is valid, and if not, determine that the system information required by the UE sent by the network side device is invalid.

In some embodiments, the network side device further includes: a broadcasting module, configured to broadcast a system message when the system information required by the UE is sent to the UE, wherein the system message includes a systemInfoValueTag, so that the UE determines whether the systemInfoValueTag and systemInfoValueTag when sending the request message is consistent, if yes, determine that the system information required by the UE sent by the network side device is valid, and if not, determine that the system information required by the UE sent by the network side device is invalid.

In some embodiments, the request message indicates system information required by the UE by using a bitmap; or the request message indicates the system information required by the UE by an index.

In some embodiments, the first receiving module is configured to receive the request message sent by the UE in a random access procedure; and the second sending module is configured to send system information required by the UE in the on-demand system information to the UE in the random access procedure.

In some embodiments, the first receiving module is configured to receive an uplink signal sent by the UE, the uplink signal corresponds to system information required by the UE; wherein the network side device further includes: a determining module, configured to determine system information required by the UE by using the uplink signal.

In some embodiments, the network side device further includes: a fifth sending module, configured to send mapping relationship information between the uplink signal and the system information to the UE.

In some embodiments, the first receiving module is configured to receive the request message sent by the UE by using a radio resource control message; or the first receiving module is configured to receive the request message sent by the UE by using a MAC control element.

In yet another aspect, a system for transmitting system information, includes: a network side device, configured to send system information to a user equipment (UE), wherein the system information is part of system information of the network side device; and the UE, configured to receive the system information sent by the network side device, wherein the UE further sends a request message to the network side device, wherein the request message is used to request system information required by the UE; the network side device is further configured to receive the request message sent by the UE, and send the system information required by the UE in on-demand system information to the UE, wherein the on-demand system information is another part of the system information of the network side device other than the part of system information; and the UE further receives system information required by the UE in the on-demand system information sent by the network side.

In yet another aspect, a user equipment (UE), includes: a processor; and a transceiver, connected with the processor and configured to transmit and receive data under the control of the processor, wherein the processor is configured to: receive system information sent by a network side device, wherein the system information is part of system information of the network side device; send a request message to the network side device, wherein the request message is used to request system information required by the UE; and receive system information required by the UE in on-demand system information sent by the network side device, wherein the on-demand system information is another part of the system information of the network side device other than the part of system information.

In yet another aspect, a network side device, includes: a processor; and a transceiver, connected with the processor and configured to transmit and receive data under the control of the processor, wherein the processor is configured to: send system information to a user equipment (UE), wherein the system information is part of system information of the network side device; receive a request message sent by the UE, wherein the request message is used to request system information required by the UE; and send system information required by the UE in the required system information to the UE, wherein on-demand system information is another part of system information other than the part of system information of the network side device.

In yet another aspect, a non-transient computer storage medium, storing computer readable instructions being executed by a processor so that the processor is configured to: receive system information sent by a network side device, wherein the system information is part of system information of the network side device; send a request message to the network side device, wherein the request message is used to request system information required by a user equipment UE; and receive system information required by the UE in on-demand system information sent by the network side, wherein the on-demand system information is another part of the system information of the network side device other than the part of system information.

In yet another aspect, a non-transient computer storage medium, storing computer readable instructions being executed by a processor so that the processor is configured to: send system information to a user equipment (UE), wherein the system information is part of system information of a network side device; receive a request message sent by the UE, wherein the request message is used to request system information required by the UE; and send system information required by the UE in the required system information to the UE, wherein on-demand system information is another part of system information other than the part of system information of the network side device.

The beneficial effects of the above technical solution of the present disclosure are as follows.

In the foregoing solution, a UE receives system information sent by a network side device, wherein the system information is part of system information of the network side device. The UE sends a request message to the network side device, wherein the request message is used to request the system information required by the UE. The UE receives the system information required by the UE in on-demand system information sent by the network side device, wherein the on-demand system information is another part of system information of the network side device other than the part of system information of the network side device. As compared with periodically broadcasting all system information in the related art, in the present disclosure, the system information may be sent as required and overhead of the system information is reduced.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments.

Figure 1:
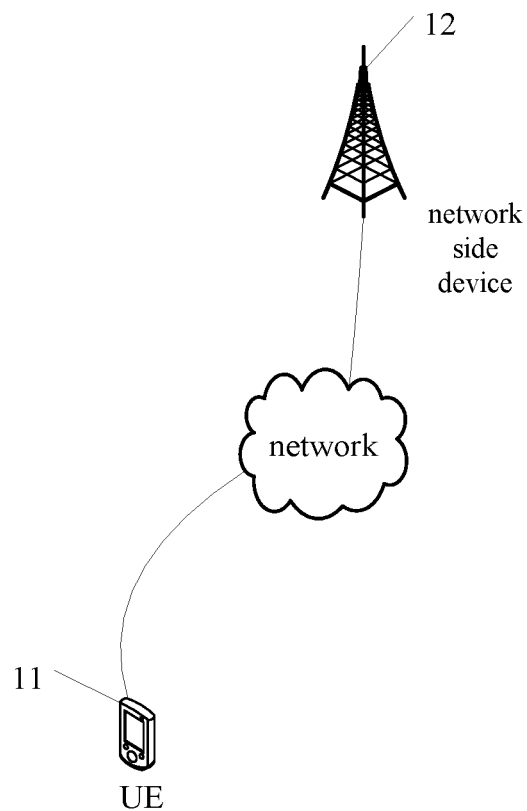
FIG. 1 is a schematic view showing a network structure according to some embodiments of the present disclosure.

FIG. 1 is a schematic diagram of a network according to some embodiments of the present disclosure. As shown in FIG. 1, one or more user equipment (UE) 11 and a network side device 12 are included. The UE 11 may be a mobile phone, a tablet personal computer, a laptop computer, a personal digital assistant (PDA), a mobile internet device (MID), or a wearable device. It should be noted that the specific type of the UE 11 is not limited in the embodiments of the present disclosure. The UE 11 can establish communication with the network side device 12. The network in FIG. 1 can indicate that the UE 11 and the network side device 12 establish wireless communication, and the network side device 12 can be an evolved Node B (eNB) or other base station, or a network side device such as an access point device. It should be noted that the specific type of the network side device 12 is not limited in the embodiments of the present disclosure.

Figure 2:
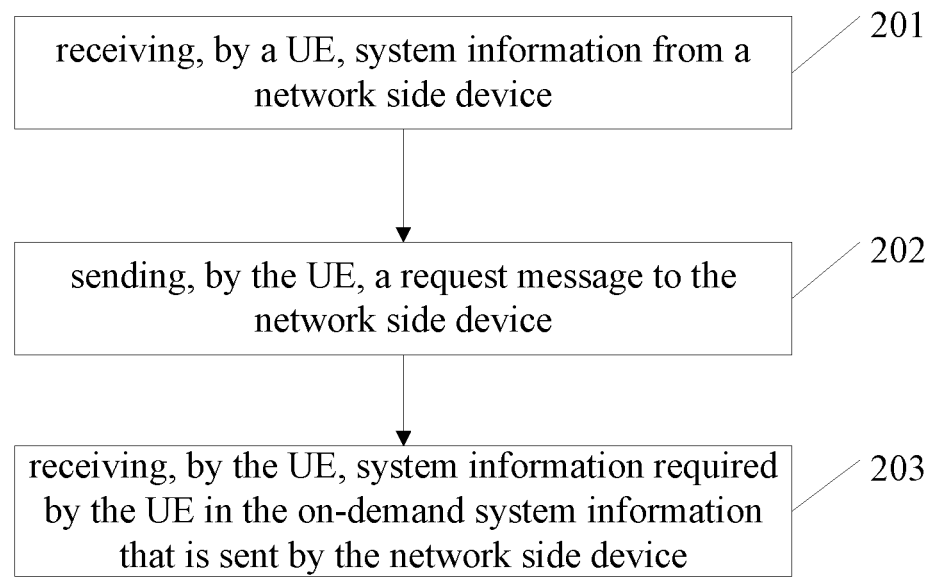
FIG. 2 is a flow chart showing a system information transmission method according to some embodiments of the present disclosure.

Based on the structure of the network shown in FIG. 1, some embodiments of the present disclosure provide a system information transmission method, as shown in FIG. 2, including the following steps.

201. The UE receives system information sent by the network side device, where the system information is part of the system information of the network side device;

202. The UE sends a request message to the network side device, where the request message is used to request system information required by the UE.

203. The UE receives the system information required by the UE in on-demand system information sent by the network side, where the on-demand system information is another part of the system information of the network side device other than the part of the system information.

In step 201, the UE may be configured to receive the system information broadcasted by the network side device periodically, that is, periodic broadcast SI. Of course, the system information in step 201 may not be broadcasted periodically or may not be transmitted by broadcasting. In addition, the system information received by the UE in step 201 is the part of system information of the network side device, for example, the system information received by the UE in step 201 may also be system information for the UE to reside in a cell and access the cell, such as a part or all of MIB, SIB1 and SIB2. In addition, the system information received by the UE in step 201 may also be system information that are necessary for the UE to reside in a cell and access the cell, and the like.

After the step 201 is performed, the UE may perform step 202, that is, UE sends the foregoing request message to the network side device to request to acquire system information required by the UE. Of course, it is not limited in some scenarios that step 202 is performed after step 201. For example, step 201 and step 202 may be performed simultaneously. In addition, the system information required by the UE may be understood as the UE determines the required system information according to its own needs. For example: all or part of the contents of SIB3-SIB20.

It should be noted that, in some embodiments of the present disclosure, the system information is not limited to MIB, and SIB1-SIB20. For example, the system information may also be SIBn, where n is an integer greater than 20, or the system information may be adapted to the development and extension of wireless communication systems in the future.

SIB1 may include related parameters of broadcasting cell access and cell selection, and scheduling information of the SI message, and may include one or more SIBs 2-13. SIB2 may include a wireless parameter configuration shared by all UEs in the cell, and other basic wireless parameter configuration. SIB3 may include cell reselection information, mainly relate to serving cell reselection parameters and co-frequency cell reselection parameters. SIB4 may include a list of co-frequency neighboring cells and a reselection parameter of each neighboring cell, and a list of co-frequency white/blacklisted cells. SIB5 may include a list of inter-frequency neighboring frequency points and reselection parameters of each frequency point, a list of inter-frequency neighboring cells, and reselection parameters of each neighboring cell, and a list of inter-frequency blacklisted cells. SIB6 may include a list of UMTS Terrestrial Radio Access-Frequency Division Duplexing (UTRAFDD) adjacent frequency points and a reselection parameter for each frequency point, a list of UTRA TDD adjacent frequency points and a reselection parameter for each frequency point. SIB7 may include a list of GSM and EDGE radio access network (GERAN) GSM EDGE Radio Access Network (GERAN) adjacent frequency points and reselection parameters for each frequency point. SIB8 may include pre-registration information of CDMA2000, a list of CDMA2000 adjacent frequency bands, and reselection parameters of each frequency band, and a list of adjacent cells of CDMA2000 adjacent frequency bands. SIB9 may include the name of a Home eNodeB. SIB10 may include a primary notification for an Earthquake and Tsunami Warning System (ETWS). SIB11 may include an ETWS secondary notification. SIB 12 may include a Commercial Mobile Alert Service (CMAS). SIB 13 may include information for acquiring Multimedia Broadcast Multicast Service (MBMS) control information related to one or more multicast broadcast single frequency networks (MBSFN) areas. SIB14-SIB20 have their own characteristics, which are not described one by one.

In some embodiments of the present disclosure, after receiving the request message, the network side device may determine system information required by the UE, for example, the system information requested by the request message is SIB3 and SIB4. After the network side device determines the system information required by the UE, the network information required by the UE in the above-mentioned on-demand system information may be sent to the UE. For example, if the above-mentioned on-demand system information includes SIB3 to SIB20, the network side device can send SIB3 and SIB4 to the UE.

In addition, it should be noted that the system information required by the UE in the above-mentioned on-demand system information may be the system information required by the UE requested by the request message. For example, the system information required by the UE requested by the request message is SIB3 and SIB4, and the on-demand system information of the network side device includes SIB3 and SIB4; or the system information required by the UE in the above-mentioned on-demand system information may be a part of the system information required by the UE requested by the request message, for example, the system information required by the UE requested by the request message is SIB3, SIB4, and SIB21, and the on-demand system information of the network side device is SIB3 to SIB20, then the system information required by the UE in the above-mentioned on-demand system information is the SIB3 and the SIB4, that is, the network side device only returns a part of system information required by UE to the UE.

In addition, the above-described on-demand system information can be understood as system information other than the system information transmitted in step 201. The on-demand system information is sent according to the requirements of the UE, so as to avoid sending system information that the UE does not need to the UE, thereby avoiding waste of overhead and saving transmission resources.

Optionally, the system information required by the UE is a part or all of the system information indicated in the information indication list acquired by the UE, and the information indication list is an indication list of the on-demand system information.

The system information required by the UE that is requested by the foregoing request message may be a part or all of the system information indicated in the information indication list acquired by the UE. The information indication list may be obtained in advance by the UE, or the information indication list may be acquired by the UE from the network side device when the UE needs to obtain the on-demand system information.

Optionally, the foregoing receiving, by the UE, the system information sent by the network side device includes: receiving, by the UE, a system message that is sent by the network side device and includes system information, where the system message further includes the information indication list.

The foregoing system message can be used by the UE to obtain the system information and the information indication list. Since the information indication list is sent by the network side device, the UE can determine on-demand system information included in the network side device by using the information indication list, so that the system information requested by the UE from the network side device in step 202 are all included in the network side device. It will not occur that the system information requested by the UE from the network side device is not provided by the network side device. For example, the system information broadcasted by the network side device periodically is MIB, SIB1, and SIB2, and the on-demand system information is SIB3-SIB8, the list of the on-demand system information may be an index list {SIB3, SIB4, SIB8} of SIB3-SIB8, may also be a bitmap {00111111000000000000} indicating the SIB index, where the bitmap indicates whether SIB1-SIBn (n is a positive integer, for example, n=20) is included in the on-demand system information. If yes, then it is denoted by 1; otherwise, it is denoted by 0. The foregoing information indication list may be acquired in an explicit manner, so that the UE can accurately obtain the on-demand system information list of the network side, and request the on-demand system information that can be obtained by the UE.

Optionally, the receiving, by the UE, system information sent by the network side device includes: receiving, by the UE, a system message that includes the system information that is sent by the network side device, and the system message further includes indication information about whether the network side device has the on-demand system information.

In this implementation, the network side device transmits the system information and the indication information to the UE by using the system message. For example, the system message broadcasted by the network side periodically does not include an on-demand system information list, and one bit in the system message broadcasted by the network side periodically indicates whether or not the on-demand system information is included. That is, if the system information area (area with the same system information, such as a cell) contains on-demand system information, it is denoted by 1; otherwise, it is denoted by 0. When the UE can determine whether the network side device has the on-demand system information according to the indication information, if yes, the network side device may request the required system information, and if not, the network side device may not request. In addition, when the network side device has the above-mentioned on-demand system information, the UE may obtain the foregoing information indication list explicitly or implicitly.

For example, the method may further include: If the indication information indicates that the network side device has the on-demand system information, sending, by the UE, a request message for obtaining the information indication list to the network side device; receiving, by the UE, the information indication list sent by the network side device.

In this implementation, the information indication list may be explicitly obtained, so that the UE can accurately obtain the on-demand system information list of the network side, and request the on-demand system information that can be obtained by the UE. The obtaining request message may be the access information (for example, random access information) in the system information broadcasted periodically, or may be sent by using the random access procedure so that the information indication list is obtained during the random access procedure. Or the foregoing obtaining request message may be request information in a radio resource control (RRC) message (for example, information for requesting to obtain the on-demand system information list) or scheduling information, etc., to obtain the foregoing information indication list through the request and response process.

For example, the method may further include: if the indication information indicates that the network side device has the on-demand system information, determining system information other than the system information included in the system message as the on-demand system information. The information indication list is an indication list of the determined on-demand system information.

In this implementation, the information indication list may be implicitly obtained, and no additional signaling overhead is required to obtain the on-demand system information list. For example, bit 1 of the system message broadcasted periodically indicates that the on-demand system information is included; the UE can estimate that the system information other than the system information broadcasted periodically is the on-demand system information. For example, if the system information broadcasted periodically is MIB, SIB1, and SIB2, then the on-demand system information is SIB3-SIBn (n=20).

In the implementation, the method for obtaining the on-demand system information list by the UE in an explicit way or an implicit way is introduced. In the explicit way, UE may accurately obtain the information indication list of the on-demand system information of the network side device, and request that the UE can obtain on-demand system information, but additional signaling overhead is necessary to obtain an on-demand system information list. In the implicit way, the UE may infer the information indication list of the on-demand system information of the network side device, without requiring an additional signaling overhead to obtain the information indication list of the on-demand system information, but the on-demand system information may not be provided by the network side device, so that the on-demand system information may not be obtained, and additional signaling overhead is also caused. Therefore, in some embodiments of the present disclosure, if the on-demand system information provided by the network side device is relatively less, such as SIB3-SIB8, the information indication list is obtained by the explicit way; if the on-demand system information provided by the network side device is relatively more, such as SIB3-SIBn (n=20), then the information indication list is obtained in the implicit way, thereby improving the resource utilization and system performance of the entire system.

Optionally, the receiving, by the UE, the system information sent by the network side device includes: receiving, by the UE, a system message that includes the system information that is sent by the network side device, where the system message further includes indication information about whether the network side device has the on-demand system information.

The method further includes: if the indication information indicates that the network side device has the on-demand system information, determining system information other than the system information included in the system message as the on-demand system information. The system information required by the UE is a part or all of the system information of the determined on-demand system information.

In this implementation, the on-demand system information of the network side device can be implicitly determined, and no additional signaling overhead is required to obtain an on-demand system information list. And the system information requested in step 202 is a part or all of the on-demand system information determined by the UE. It should be noted that, in this embodiment, the on-demand system information determined by the UE can be understood as the on-demand system information of the network side device estimated by the UE, that is, the determined on-demand system information can be the same or different from the on-demand system information of the network-side device. For example, if bit 1 of the system message broadcasted periodically indicates that the on-demand system information is included, the UE can estimate that the system information other than the system information broadcasted periodically is the on-demand system information. For example, if the system information broadcasted periodically is MIB, SIB1, and SIB2, then the on-demand system information is SIB3-SIBn (n=20).

Optionally, the receiving, by the UE, the system information required by the UE in the on-demand system information that is sent by the network side includes: receiving, by the UE, the response message sent by the network side, where the response message includes all system information required by the UE in the on-demand system information.

In this implementation, the network side device may send all system information required by the UE to the UE by using the foregoing response message. For example, the system information required by the UE is SIB3, SIB4, and SIB10, and the network side device sends the SIB3, SIB4, and SIB10 to the UE by using the foregoing response message.

Optionally, the receiving, by the UE, the system information required by the UE in the on-demand system information that is sent by the network side includes: receiving, by the UE, the response message sent by the network side, where the response message includes a part of system information required by the UE in the on-demand system information, and indication information indicating that another part of the system information required by the UE cannot be provided.

In this implementation, the network side device may send a part of the system information required by the UE to the UE by using the foregoing response message, and indicate that another part of the system information required by the UE cannot be provided. For example, if the system information required by the UE is SIB3, SIB4, and SIB10, but the network side device only has the system information of SIB3 to SIB8, then the network side device can only provide SIB3 and SIB4, but cannot provide SIB10. For example, the information indication list of the on-demand system information that is implicitly acquired by the UE is {SIB3, SIB4, . . . , SIB20}, but the network side device can only provide SIB3 to SIB8, that is, if the UE explicitly obtains the information indication list, then the information indication list is {SIB3, SIB4, . . . , SIB8} or {00111111000000000000}. However, since the UE implicitly obtains, the request message sent by the UE is the request {SIB3, SIB4, SIB10} or {00110000010000000000}. In this way, the network side device provides the system information of the SIB3 and the SIB4 to the UE, and further indicates that the system information of the SIB10 cannot be provided.

Optionally, the receiving, by the UE, the system information required by the UE in the on-demand system information that is sent by the network, includes: receiving, by the UE, the response message sent by the network side in a multicast way, where the response message includes all system information required by the UE in the on-demand system information, and all system information required by other UEs in the on-demand system information.

In this implementation, the on-demand system information can be provided to multiple UEs in a multicast manner to save transmission resources. For example, the system information requested by UE1 is {SIB3, SIB4}, the system information requested by UE2 is {SIB5, SIB6}, and the system information requested by UE3 is {SIB3, SIB4, SIB5, SIB6}, and the network side device sends the response message of the on-demand system information to the three UEs in a multicast manner based on on-demand system information request messages from the three UEs in combination with the on-demand system information that can be provided by the network side device, the response message includes the system information of SIB3, SIB4, SIB5 and SIB6. Specifically, the network side device schedules the response message of the on-demand system information by using the physical downlink control channel (PDCCH) scrambled by the system information-radio network temporary identifier (SI-RNTI) (for example, OD-SI-RNTI), and the three UEs are addressed by the on-demand SI-RNTI.

Further, the on-demand SI-RNTI may be an RNTI specified in a protocol. In addition, for the response message of the on-demand system information sent in the multicast mode, the network side device may repeatedly send the on-demand system information, and the system information reception performance is improved by the UE through retransmission combination by the hybrid automatic repeat request (HARD) (no ACK/NACK feedback).

Optionally, the receiving, by the UE, the system information required by the UE in the system information that is sent by the network, includes: receiving, by the UE, the response message sent by the network side in a multicast way, where the response message includes system information required by the UE in the on-demand system information, and system information required by other UEs in the on-demand system information, and indication information indicating that part of system information cannot be provided, wherein the part of system information is part of system information requested by the request message and/or requested by the other UEs.

In this implementation, the network side device may be configured to send the on-demand system information to multiple UEs in a multicast way, where the transmitted system information may be part of system information requested by multiple UEs, and the indication information indicates that UE cannot provide another part of system information. For example, the system information requested by UE1 is {SIB3, SIB4}, the system information requested by UE2 is {SIB5, SIB10}, and the system information that the network side device can provide is {SIB3, . . . , SIB8}, and the network side device sends a response message of the on-demand system information to the two UEs in a multicast way based on the request message of the on-demand system information sent by the two UEs in combination with the on-demand system information that can be provided by the UE, the response message includes system information of SIB3, SIB4, and SIB5 and indicates that SIB10 cannot be provided.

Optionally, the receiving, by the UE, the system information required by the UE in the system information that is sent by the network includes: receiving, by the UE, the response message sent by the network side in a multicast way, where the response message includes all system information required by the UE in the on-demand system information, and a failure indication information indicating that system information required by other UEs cannot be provided.

In this implementation, the response message may be sent to multiple UEs in a multicast way, and if the system information requested by a certain UE cannot be provided by the network side device, the response message may carry failure indication message indicating that the required system information cannot be provided. For example, the system information requested by UE1 is {SIB3, SIB4}, the system information requested by UE2 is SIB10, and the system information that the network side device can provide is {SIB3, . . . , SIB8}, and the network side device sends a response message of the on-demand system information to the two UEs in a multicast way based on the on-demand system information request message sent by the two UEs in combination with the on-demand system information that can be provided by the network side device, the response message includes system information of SIB3 and SIB4, and indicates that UE2 cannot obtain.

Optionally, the receiving, by the UE, the system information required by the UE in the system information that is sent by the network, includes: receiving, by the UE, the system information required by the UE in the on-demand system information sent by the network side when the on-demand system information of the network side device includes the system information required by the UE.

The method further includes: when the system information of the network side device does not include the system information required by the UE, receiving, by the UE, a system information acquisition failure message sent by the network side device.

In this implementation, if the on-demand system information provided by the network side device does not include the required system information required by the UE, the network side device sends a failure message of an on-demand system information to the UE.

Optionally, the receiving, by the UE, the system information required by the UE in the system information that is sent by the network, includes: receiving, by the UE, a response message sent by the network side, where the response message includes the system information required by the UE in the on-demand system information, and a system information value tag (systemInfoValueTag).

The method further includes: determining, by the UE, whether the systemInfoValueTag is consistent with the systemInfoValueTag when the request message is sent, if yes, determining that the system information required by the UE sent by the network side device is valid, if not, determining the system information required by the UE sent by the network side device is invalid.

In this implementation, the systemInfoValueTag may be included in the response message, so that the UE may determine whether the acquired system information is valid according to the systemInfoValueTag. For example, systemInfoValueTag is sent in the response message of the on-demand system information and in the system information broadcasted periodically. If the systemInfoValueTag included in the response message of the system information received by the UE and systemInfoValueTag in the system information broadcasted periodically when UE sends the request message of the on-demand system information are different, it indicates that the on-demand system information acquired by the UE is invalid. Then, the UE can perform a next transmission and reception process of the on-demand system information.

Optionally, the method further includes: obtaining, by the UE, systemInfoValueTag, where the systemInfoValueTag is a systemInfoValueTag in a system message broadcasted periodically by the network side device when the UE receives the system information required by the UE sent by the network side device; determining, by the UE, whether the systemInfoValueTag is consistent with the systemInfoValueTag when the request message is sent, if yes, determining that the system information required by the UE sent by the network side device is valid, if not, determining the system information required by the UE sent by the network side device is invalid.

In this implementation, it is determined whether the on-demand system information is valid based on the systemInfoValueTag when receiving the on-demand system information, if the systemInfoValueTag when receiving the on-demand system information is different from the systemInfoValueTag when sending the request message, it is determined that the on-demand system information is invalid, otherwise, it is determined that the on-demand system information is valid. For example, systemInfoValueTag is sent in the system information broadcasted periodically. If the systemInfoValueTag included in the system information broadcasted periodically when the UE receives the response message of the on-demand system information is different from the systemInfoValueTag included in the system information broadcasted periodically when the UE sends the request message of the on-demand system information, it indicates that the on-demand system information acquired by the UE is invalid. Then, the UE can perform a next transmission and reception process of the on-demand system information.

Optionally, the foregoing request message indicates the system information required by the UE by using a bitmap.

In this embodiment, the system information required by the UE may be represented by a bitmap. For example, if the system information required by the UE is {SIB3, SIB4}, the request message may include a bitmap {00110000000000000000}. Upon receiving the bitmap, the network side device can determine that the system information required by the UE is {SIB3, SIB4}. In addition, in this embodiment, various implementations described above may be combined, for example, the foregoing implementation relating to the information indication list may be combined, that is, the system information indicated in the information indication list is represented by a bitmap. The implementation relating to the non-information indication list described above may be combined. The bitmap represents the determined on-demand system information, that is, the bitmap represents the index of the system information.

Optionally, the request message indicates, by using an index, system information required by the UE.

In this implementation, system information required by the UE may be represented by an index. For example, if the system information required by the UE is {SIB3, SIB4}, then the above request message may include an index of {SIB3, SIB4}. In addition, in this embodiment, various implementation described above may be combined, for example, the implementation relating to the information indication list may be combined, and then the index may be a list index of system information in the information indication list. The implementation relating to the non-information indication list described above may be combined. Then, the index may be an index of system information, such as an index of an information function or an information name.

Optionally, the sending, by the UE, the request message to the network side device includes: sending, by the UE, the request message to the network side device in a random access procedure. The receiving, by the UE, system information required by the UE in the on-demand system information sent by the network side, including: receiving, by the UE, system information required by the UE in the on-demand system information sent by the network side device in the random access process.

In this implementation, system information required by UE is acquired in the random access process, and system information required by the UE is acquired by the UE in an idle state or inactive state through the random access procedure. For example, the request message may be sent by the message 3 (Msg3) in the random access process, and the system information required by the UE may be sent by the message 4 (Msg4) in the random access process.

Optionally, the sending, by the UE, the request message to the network side device includes: sending, by the UE, an uplink signal to the network side device, where the uplink signal corresponds to system information required by the UE, so that the network side device determines system information required by the UE by using the uplink signal.

In this implementation, system information required by the UE is requested from the network side device by the uplink signal. The uplink signal may be a preamble or a synchronization code (Sync) uplink signal. After the network side device receives the uplink signal, it can determine its corresponding system information. For example, the network side device and the UE negotiate the mapping relationship between the uplink signal and the system information in advance, so that the UE sends an uplink signal based on the mapping relationship, and the network side device determines the system information required by the UE based on the mapping relationship.

Of course, in this implementation, the method may further include the following steps.

The UE receives the mapping relationship information between the uplink signal and the system information sent by the network side device.

For example, the network side device sends the mapping relationship information to the UE by using a broadcast system message. The mapping relationship information may include a one-to-one mapping relationship, that is, one uplink signal corresponds to one system information. For example, Preamble1 corresponds to SIB3, and Preamle2 corresponds to SIB4. Or the mapping relationship information may include a one-to-multiple mapping relationship, that is, one row signal may correspond to multiple system information, for example, Preamble3 corresponds to SIB3 and SIB4.

Optionally, the sending, by the UE, the request message to the network side device includes: sending, by the UE, the request message to the network side device by using an RRC message.

In this implementation, network side device requests system information by using a radio resource control (RRC) message. For example, the RRC message may include a bitmap or an index of system information required by the UE.

Optionally, the sending, by the UE, the request message to the network side device includes: sending, by the UE, the request message to the network side device by using a MAC control element (CE).

In this implementation, network side device requests system information by using MAC CE. For example, the MAC CE may include a bitmap or an index of system information required by the UE.

It should be noted that the various implements may be implemented in combination with each other, and may be implemented separately.

In some embodiments of the present disclosure, the UE receives the system information sent by the network side device, where the system information is part of the system information of the network side device; the UE sends a request message to the network side device, where the request message is used to request the system information required by the UE, and the UE receives system information required by the UE in the on-demand system information that is sent by the network side, where the on-demand system information is another part of the system information other than the part of system information of the network side device. In this way, system information can be sent on demand, and as compared with the solution in related technologies that all system information is periodically broadcasted, and embodiments of the present disclosure can reduce system information overhead.

Figure 3:
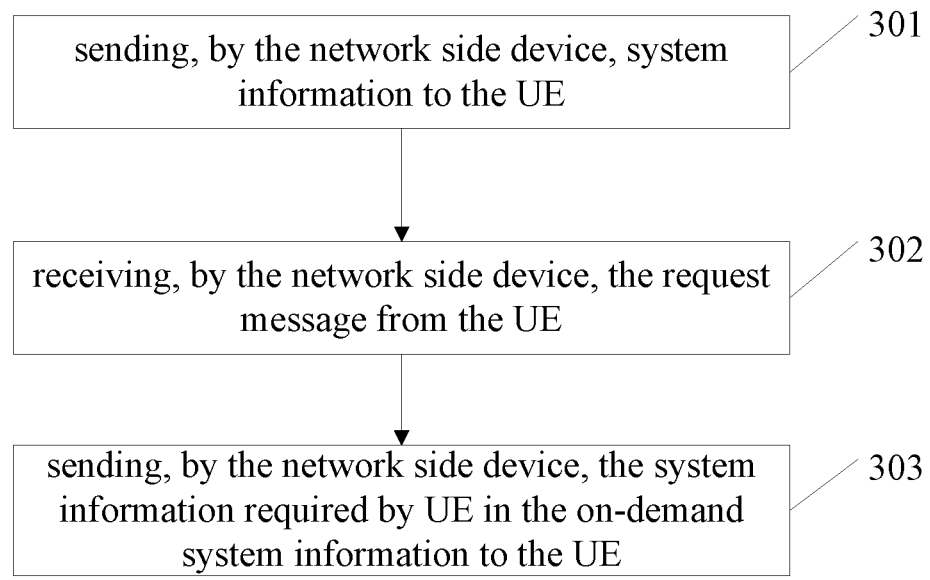
FIG. 3 is another flow chart showing a system information transmission method according to some embodiments of the present disclosure.

Based on the network structure shown in FIG. 1, some embodiments of the present disclosure provide another system information transmission method, as shown in FIG. 3, including the following steps.

301. The network side device sends system information to the UE, where the system information is part of system information of the network side device.

302. The network side device receives a request message sent by the UE, where the request message is used to request system information required by the UE.

303. The network side device sends, to the UE, system information required by the UE in the on-demand system information, where the on-demand system information is another part of the system information other than the part of system information of the network side device.

Optionally, the system information required by the UE is part or all of the system information indicated in the information indication list acquired by the UE, and the information indication list is an indication list of the on-demand system information.

Optionally, the sending, by the network side device, system information to the UE, includes: sending, by the network side device, a system message including system information to the UE, where the system message further includes the information indication list.

Optionally, the sending, by the network side device, the system information to the UE, includes: sending, by the network side device, a system message including system information to the UE, and the system message further includes indication information indicating whether the network side device has the on-demand system information.

Optionally, the method further includes: if the indication information indicates that the network side device has the on-demand system information, receiving, by the network side device, an acquisition request message of the information indication list sent by the UE; sending, by the network side device, the information indication list to the UE.

Optionally, if the indication information indicates that the network side device has the on-demand system information, so that the UE determines system information other than the system information included in the system message as an on-demand system information. The information indication list is an indication list of the determined on-demand system information.

Optionally, the sending, by the network side device, system information to the UE, includes: sending, by the network side device, a system message including the system information to the UE, where the system message further includes indication information indicating whether the network side device has the on-demand system information, if the indication information indicates the network side device has the on-demand system information, the UE determines system information other than the system information included in the system message as the on-demand system information. The system information required by the UE is part or all of the system information of the determined on-demand system information.

Optionally, the sending, by the network side device, the system information required by the UE in the on-demand system information to the UE, includes: sending, by the network device, a response message to the UE, where the response message includes all system information required by the UE in the on-demand system information; or sending, by the network device, a response message to the UE, where the response message includes a part of system information required by the UE in the on-demand system information, and indication information indicating that another part of system information required by the UE cannot be provided; or sending, by the network side device, a response message to the UE in a multicast way, where the response message includes all system information required by the UE in the on-demand system information, and all system information required by other UEs in the on-demand system information; or sending, by the network side device, a response message to the UE by using a multicast way, where the response message includes system information required by the UE in the on-demand system information, and the system information required by other UEs in the on-demand system information, and indication information indicating that part of system information cannot be provided, wherein the part of system information is part of system information requested by the request message and/or requested by the other UE; or sending, by the network side device, a response message to the UE in a multicast way, where the response message includes all system information required by the UE in the on-demand system information, and a failure indication message indicating that system information required by other UEs cannot be provided.

Optionally, the sending, by the network side device, the system information required by the UE in the on-demand system information to the UE, includes: when the on-demand system information of the network side device includes the system information required by the UE, sending, by the network side device, system information required by the UE in the on-demand system information to the UE.

The method further includes: when the system information of the network side device does not include the system information required by the UE, sending, by the network side device, an acquisition failure message of the system information to the UE.

Optionally, the sending, by the network side device, the system information required by the UE in the on-demand system information to the UE, includes: sending, by the network side device, a response message to the UE, where the response message includes system information required by the UE in the on-demand system information, and a systemInfoValueTag, so that the UE determines whether the systemInfoValueTag and the systemInfoValueTag during sending the request message is consistent, if yes, determining that the system information required by the UE sent by the network side device is valid, and if not, determining that the system information required by the UE sent by the network side device is invalid.

Optionally, the method further includes: when the system information required by the UE is sent to the UE, broadcasting, by the network side device, a system message, where the system message includes a systemInfoValueTag, so that the UE determines whether the systemInfoValueTag and the systemInfoValueTag during sending the request message is consistent, if yes, determining that the system information required by the UE sent by the network side device is valid, and if not, determining that the system information required by the UE sent by the network side device is invalid.

Optionally, the request message indicates, by using a bitmap, system information required by the UE; or the request message indicates the system information required by the UE by an index.

Optionally, the receiving, by the network side device, the request message sent by the UE includes: receiving, by the network side device, the request message sent by the UE in a random access procedure. The sending, by the network side device, the system information required by the UE in the on-demand system information, includes: sending, by the network side device, the system information required by the UE in the on-demand system information to the UE in the random access procedure.

Optionally, the receiving, by the network side device, the request message sent by the UE includes: receiving, by the network side device, an uplink signal sent by the UE, where the uplink signal corresponds to system information required by the UE.

The method further includes: determining, by the network side device, system information required by the UE by using the uplink signal.

Optionally, the method further includes: sending, by the network side device, mapping relationship information between the uplink signal and the system information to the UE.

Optionally, the receiving, by the network side device, the request message sent by the UE includes: receiving, by the network side device, the request message sent by the UE by using an RRC message; or receiving, by the network side device, the request message sent by the UE by using a MAC CE.

It should be noted that in the network side device in the present embodiment corresponds to the embodiment shown in FIG. 2, and a specific implementation may refer to the related description of the embodiment shown in FIG. 2, so as to avoid repeated explanation. In this embodiment, the overhead of system information can also be reduced.

The following is some examples of the embodiments described above.

Figure 4:
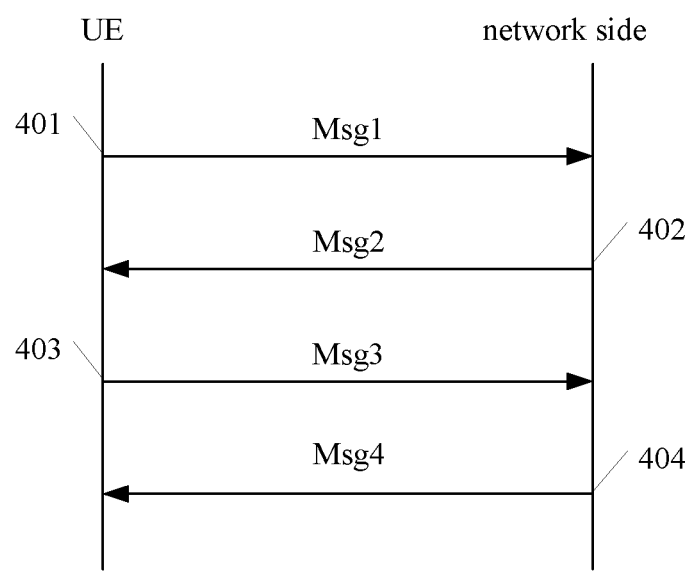
FIG. 4 is yet another flow chart showing a system information transmission method according to some embodiments of the present disclosure.

Example 1: this example uses an idle state or an inactive UE to perform on-demand system information transmission through a random access procedure. As shown in FIG. 4, the method includes the following steps.

401. The UE obtains random access information by using the system information broadcasted periodically, and initiates a random access procedure, and sends a message 1 (Msg1), where the Msg1 may include a Preamble.

402. The network side device sends a message 2 (Msg2) to the UE. The Msg2 may include a random access response (RAR) message, including parameters such as a backoff parameter, a Preamble code corresponding to Msg1, and an uplink transmission timing advance (UL TA), uplink (UL) grant, temporary cell-radio network temporary identifier (C-RNTI). The UE receives Msg2 within the random access response window.

403. The UE sends Msg3 to the network side device based on its own needs, and the Msg3 can be understood as a request message of the on-demand system information.

404. The network side device sends Msg4 to the UE based on the request message of the on-demand system information sent by the UE by combining the on-demand system information provided by the network side device, and the Msg4 may be the response message of the on-demand system information or a failure message of the on-demand system information. Specifically, the network side device schedules the Msg4 with the PDCCH scrambled by the temporary C-RNTI.

The UE receives Msg4 in an on-demand system information response window, the Msg4 is the response message of the on-demand system information or the failure message of the on-demand system information. Specifically, the UE addresses by using the temporary C-RNTI.

Figure 5:
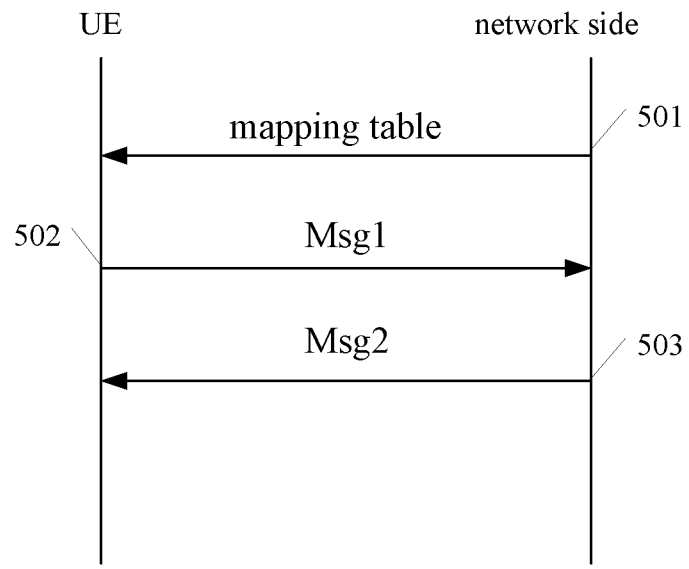
FIG. 5 is still yet another flow chart showing a system information transmission method according to some embodiments of the present disclosure.

Example 2: this example uses an idle or an inactive UE to perform on-demand system information transmission through an uplink signal process. As shown in FIG. 5, the following steps are included.

501. The network side sends a mapping table between an uplink signal (for example, a Preamble code, a Sync code, and the like) and an on-demand system information to the UE by using system information broadcasted periodically. For example, Preamble1 corresponds to SIB3, Preamle2 corresponds to SIB4 or Preamble3 corresponds to SIB3 and SIB4.

502. The UE sends an Msg1 to the network side based on its own requirement, where the Msg1 includes an uplink signal, and is used to indicate a request message of the on-demand system information. For example, if the on-demand system information required by the UE is SIB3 and SIB4, the UE sends Preamble1 and Preamble2 or Preamble3 to the network side device.

503. The network side device sends an Msg2 to the UE based on the request message of the on-demand system information corresponding to the uplink signal sent by the UE by combining the on-demand system information provided by the network side device, and the Msg2 includes a response message of the on-demand system information, where system information of SIB4 and SIB3 are included. Specifically, the network side device schedules Msg2 with the PDCCH scrambled by using the SI-RNTI by the network side device.

The UE receives Msg2 in the on-demand system information response window. Msg2 is the response message of the on-demand system information. Specifically, the UE addresses by the on-demand SI-RNTI.

Figure 6:
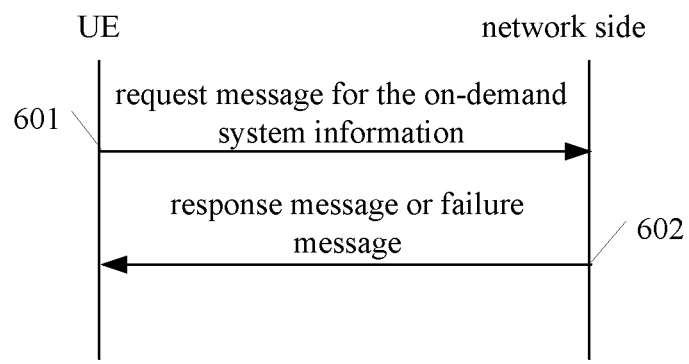
FIG. 6 is still yet another flow chart showing a system information transmission method according to some embodiments of the present disclosure.

Example 3: the UE in a connected state sends an on-demand system information through an RRC message or a MAC CE. As shown in FIG. 6, the method includes the following steps.

601. The UE sends a request message of the on-demand system information to the network side based on the requirements of the UE, and the request message includes an on-demand system information list, which may be an RRC message or a MAC CE. Specifically, the RRC message includes an on-demand system information list, which may be an index list. The MAC CE includes an on-demand system information list, which may be a bitmap indicating the SIB index, where the bitmap indicates whether the SIB1~SIBn are included in the on-demand system information, if yes, it is represented by 1; otherwise, it is represented by 0.

602. The network side device sends a response message of the on-demand system information or a failure message of the on-demand system information to the UE based on the request message of the on-demand system information sent by the UE by combining the on-demand system information that can be provided by the network side device. Specifically, the network side device schedules the message by using a PDCCH scrambled by C-RNTI.

The UE receives the response message of the on-demand system information or the failure message of the on-demand system information in an on-demand system information response window. Specifically, the UE performs addressing through the C-RNTI.

Example 4: the system indication list of the on-demand system information is not included in the system information broadcasted periodically, and the idle or inactive UE performs the on-demand system information transmission and reception through the random access procedure. The following steps are included.

Step 1: the idle or inactive UE1 receives the system information broadcasted periodically by the network side device, which is MIB, SIB1, and SIB2. The system information broadcasted periodically by the network side device does not include the information indication list of the on-demand system information, but the 1-bit indicates the on-demand system information is included. At the same time, the UE1 obtains randomly accessed information by using the system information broadcasted periodically.

Step 2: Since the system information broadcasted periodically does not include the on-demand system information list, and bit 1 in the system information broadcasted periodically is used to indicate the on-demand system information is included, the UE1 can infer the system information other than system information broadcasted periodically is the on-demand system information. For example, the on-demand system information is SIB3~SIBn (n=20).

Step 3: The UE1 initiates a random access procedure and sends an Msg1, that is, a Preamble.

Step 4: The network side device sends Msg2, that is, a random access response message, to the UE1, and the UE receives the Msg2 in the random access response window.

Step 5: The system indication list of the on-demand system information implicitly acquired by UE1 is {SIB3, SIB4, . . . , SIB20}, and the system information required by the UE1 is SIB3, SIB4 and SIB14. Based on its own needs, UE1 sends Msg3, that is, a request message of the on-demand system information, to the network side device, and the list of on-demand system information contained therein is {SIB3, SIB4, SIB14}.

Step 6: The network side device sends Msg4 to UE based on the request message of the on-demand system information sent by the UE1, in combination with the on-demand system information SIB3~SIB13 that can be provided by the UE1, Msg 4 is the response message of the on-demand system information including the system information of SIB3 and SIB4, and an indication that SIB14 cannot be provided, such as the index of SIB14. Specifically, the network side device schedules Msg4 with the PDCCH scrambled by the temporary C-RNTI.

Step 7. The UE1 receives the Msg4 in the on-demand system information response window, Msg4 is the response message of the on-demand system information. Specifically, UE1 is addressed by a temporary C-RNTI. UE1 obtains the system information of the SIB3 and the SIB4 from the response message of the on-demand system information, and knows that the system side device does not provide the system information of the SIB 14.

Example 5: the system information broadcasted periodically includes the system indication list of the on-demand system information, and the idle or inactive UE performs the on-demand system information transmission and reception by using the uplink signal process, and the following steps are included.

Step 1: the idle or inactive UE2 and the UE3 receive the system information broadcasted periodically by the network side device, which are MIB, SIB1 and SIB2. The system information broadcasted periodically by the network side device includes an on-demand system information list, which is {SIB3, SIB4, . . . , SIB8}. At the same time, the network side sends a mapping table of Preamble and on-demand system information by using the system information broadcasted periodically. Preamble1 corresponds to SIB3, Preamle2 corresponds to SIB4, Preamble3 corresponds to SIB5 and SIB6, and Preamble4 corresponds to SIB7 and SIB8.

Step 2: UE2 and UE3 directly obtain the on-demand system information list and the mapping relationship between the Preamble and the SIB through the system information broadcasted periodically.

Step 3: The on-demand system information required by UE2 is SIB3 and SIB4, and then UE2 sends Preamble1 and Preamble2 to the network side device to indicate its on-demand system information request message. The on-demand system information required by UE3 is SIB3 and SIB5, then UE3 sends Preamble1 and Preamble3 to the network side device to indicate its on-demand system information request message.

Step 4: The network side sends the response message of the on-demand system information to the UE2 and the UE3 in a multicast way based on the request message of the on-demand system information sent by the two UEs by combining the on-demand system information SIB3~SIB8 that can be provided by the network side device. The response message includes the system information of SIB3, SIB4, SIB5, and SIB6. Specifically, the network side schedules the response message of the on-demand system information by using PDCCH scrambled by an on-demand SI-RNTI.

Step 5: UE2 and UE3 receive the response message of the on-demand system information in an on-demand system information response window. Specifically, UE2 and UE3 are addressed by an on-demand SI-RNTI. UE2 obtains the system information of the SIB3 and the SIB4 from the response message of the on-demand system information, and UE3 obtains the system information of the SIB3 and the SIB5 from the response message of the on-demand system information.

Example 6: the system information broadcasted periodically does not include the on-demand system information list, and UE in a connected state performs the on-demand system information transmission and reception through the RRC message.

Step 1: UE4 in a connected state receives the system information broadcasted periodically by the network side device, which is MIB, SIB1, and SIB2. The system information broadcasted periodically by the network side device does not include the on-demand system information list, but the 1-bit is used to indicate the on-demand system information is included.

Step 2: Since the system information broadcasted periodically does not include the on-demand system information list, and bit in in the system information broadcasted periodically is used to indicate the on-demand system information is included, UE4 can obtain the on-demand system information list by a request and response way. Specifically, UE4 requests to obtain an on-demand system information list by using the request information or the scheduling information in the RRC message, and the network side sends the on-demand system information list by using an RRC message, for example, the RRC message includes an on-demand system information list {SIB3, SIB4, . . . , SIB8}.

Step 3: UE4 displays that the acquired on-demand system information list is {SIB3, SIB4, . . . , SIB8}, and when the system information required by the UE4 is SIB3 and SIB4, sends the request message of the on-demand system information to the network side device, including the on-demand system information list {SIB3, SIB4}.

Step 4: The network side device sends the response message of the on-demand system information to the UE4 based on the request message of the on-demand system information sent by the UE4, in combination of the on-demand system information SIB3~SIB8 that can be provided by the network side device, and the response message includes the system information of the SIB3 and the SIB4. Specifically, the network side device schedules the message by using PDCCH scrambled by C-RNTI.

Step 5: UE4 receives the response message of the on-demand system information in the on-demand system information response window. Specifically, UE4 is addressed by the C-RNTI, and UE4 obtains the system information of the SIB3 and the SIB4 from the response message of the on-demand system information.

Example 7: the system information broadcasted periodically includes the on-demand system information list, and two UEs in a connected state perform on-demand system information transmission and reception through the MAC CE.

Step 1, UE5 and UE6 in the connected state receive the system information broadcasted periodically, which are MIB, SIB1 and SIB2. The system information broadcasted periodically includes an on-demand system information list, which is {00111111000000000000}, where the bitmap indicates whether SIB1~SIBn(n=20) is included in the on-demand system information, and if yes, it is represented by 1; otherwise, it is represented by 0.

Step 2: UE5 and UE6 obtain the on-demand system information list directly through the system information broadcasted periodically by the network side device as {00111111000000000000}.

Step 3: The on-demand system information required by UE 5 is SIB3 and SIB4, and then UE 5 sends a request message of the on-demand system information to the network side, where the on-demand system information list is {00110000000000000000}. At this time, the systemInfoValueTag in the system information broadcasted periodically is 5. The on-demand system information required by UE6 is SIB3 and SIB5, and then UE6 sends the request message of the on-demand system information to the network side, where the on-demand system information list is {00101000000000000000}. At this time, the systemInfoValueTag in the system information broadcasted periodically is 6.

Step 4: The network side device sends the response message of the on-demand system information to the UE5 and the UE6 in a multicast way based on the request message of the on-demand system information sent by the two UEs in combination with the on-demand system information SIB3~SIB8 that can be provided by the network side device. The response message includes system information of SIB3, SIB4, and SIB5, and systemInfoValueTag is 6. Specifically, the network side device schedules the response message of the on-demand system information by using PDCCH scrambled by the on-demand SI-RNTI.

The network side device repeatedly transmits the on-demand system information, and UE5 and UE6 improve the system information reception performance by HARQ retransmission combination (without ACK/NACK feedback).

Step 5: UE5 and UE6 receive the response message of the on-demand system information in an on-demand system information response window. Specifically, UE5 and UE6 are addressed by the on-demand SI-RNTI. UE 5 obtains the system information of the SIB3 and the SIB4 from the response message of the on-demand system information, and the systemInfoValueTag is 6. Since systemInfoValueTag included in the response message of the on-demand system information when UE5 receives the response message is different from systemInfoValueTag in the system information broadcasted periodically when UE5 sends the request message of the on-demand system information, it means that the on-demand system information acquired by UE5 is invalid. Then UE5 needs to perform the next on-demand system information transmission and reception process. UE 6 obtains the system information of the SIB3 and the SIB5 from the response message of the on-demand system information, and the systemInfoValueTag is 6. Since systemInfoValueTag included in the response message of the on-demand system information when UE6 receives the response message is the same as systemInfoValueTag in the system information broadcasted periodically when UE6 sends the request message of the on-demand system information, it means that the on-demand system information acquired by UE6 is valid.

Figure 7:
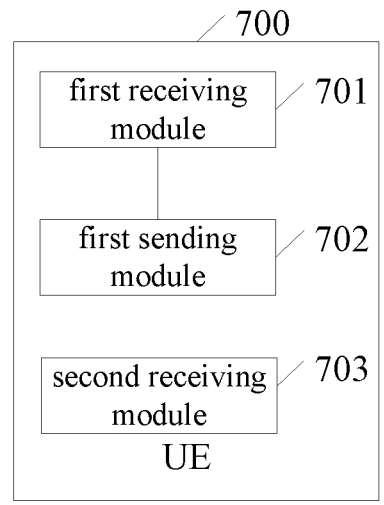
FIG. 7 is a schematic view showing a user equipment according to some embodiments of the present disclosure.

FIG. 7 shows a structure of a UE and the UE 700 includes the following modules.

A first receiving module 701 is configured to receive system information sent by the network side device, where the system information is part of system information of the network side device.

A first sending module 702 is configured to send a request message to the network side device, where the request message is used to request system information required by the UE.

A second receiving module 703 is configured to receive system information required by the UE in the on-demand system information sent by the network side, where the on-demand system information is another part of the system information of the network side device other than the part of system information.

Optionally, the system information required by UE 700 is a part or all of the system information indicated in the information indication list acquired by the UE, and the information indication list is an indication list of the on-demand system information.

Optionally, the first receiving module 701 is configured to receive a system message that is sent by the network side device and includes system information, where the system message further includes the information indication list.

Optionally, the first receiving module 701 is configured to receive, a system message that includes the system information that is sent by the network side device, and the system message further includes indication information about whether the network side device has the on-demand system information.

Figure 8:
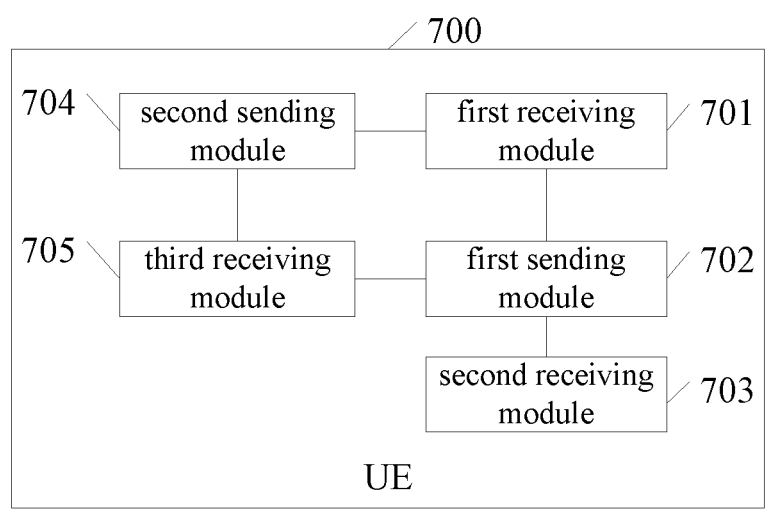
FIG. 8 is another schematic view showing a user equipment according to some embodiments of the present disclosure.

Optionally, as shown in FIG. 8, UE 700 further includes: a second sending module 704, configured to, if the indication information indicates that the network side device has the on-demand system information, send a request message for obtaining the information request list to the network side device; a third receiving module 705, configured to receive the information indication list sent by the network side device.

Figure 9:
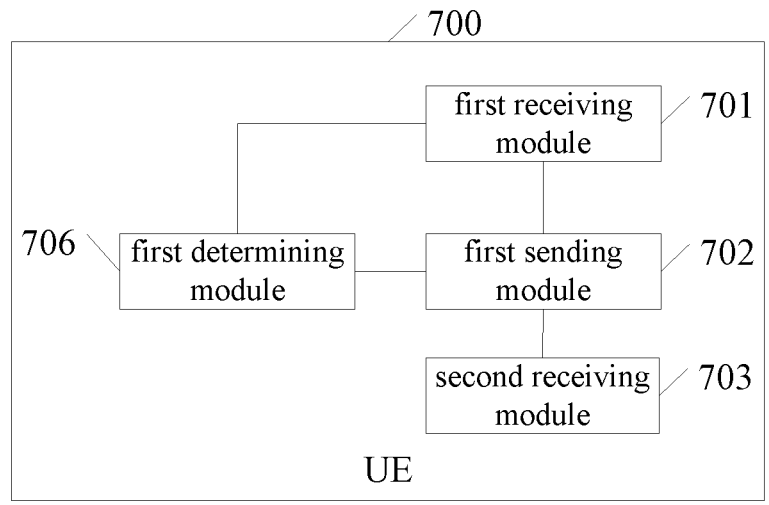
FIG. 9 is yet another schematic view showing a user equipment according to some embodiments of the present disclosure.

Optionally, as shown in FIG. 9, the UE 700 further includes: a first determining module 706, configured to, if the indication information indicates that the network side device has the on-demand system information, determine system information other than the system information included in the system message as the on-demand system information. The information indication list is an indication list of the determined on-demand system information.

Optionally, the first receiving module 701 is configured to receive a system message that includes the system information that is sent by the network side device, where the system message further includes indication information about whether the network side device has the on-demand system information.

Figure 10:
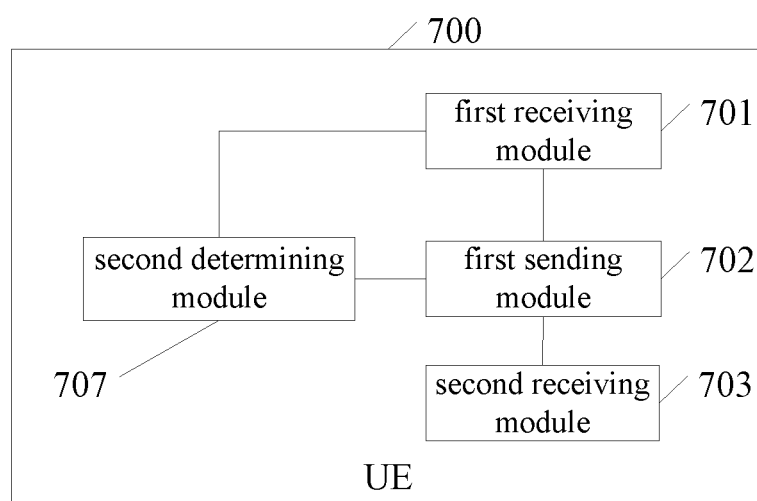
FIG. 10 is still yet another schematic view showing a user equipment according to some embodiments of the present disclosure.

As shown in FIG. 10, the UE 700 further includes: a second determining module 707, configured to, if the indication information indicates that the network side device has the on-demand system information, determine system information other than the system information included in the system message as the on-demand system information. The system information required by the UE is a part or all of the system information of the determined on-demand system information.

Optionally, the second receiving module 703 is configured to receive the response message sent by the network side, where the response message includes all system information required by the UE in the on-demand system information; or the second receiving module 703 is configured to receive a response message sent by the network side, where the response message includes a part of system information required by the UE in the on-demand system information, and indication information indicating that another part of the system information required by the UE cannot be provided; or the second receiving module 703 is configured to receive a response message sent by the network side in a multicast way, where the response message includes all system information required by the UE in the on-demand system information, and all system information required by other UEs in the on-demand system information; or the second receiving module 703 is configured to receive the response message sent by the network side in a multicast way, where the response message includes system information required by the UE in the on-demand system information, and system information required by other UEs in the on-demand system information, and indication information indicating that part of system information cannot be provided, wherein the part of system information is part of system information requested by the request message and/or requested by the other UEs; or the second receiving module 703 is configured to receive the response message sent by the network side in a multicast way, where the response message includes all system information required by the UE in the on-demand system information, and a failure indication information indicating that system information required by other UEs cannot be provided.

Optionally, the second receiving module 703 is configured to receive the system information required by the UE in the on-demand system information sent by the network side when the on-demand system information of the network side device includes the system information required by the UE.

Figure 11:
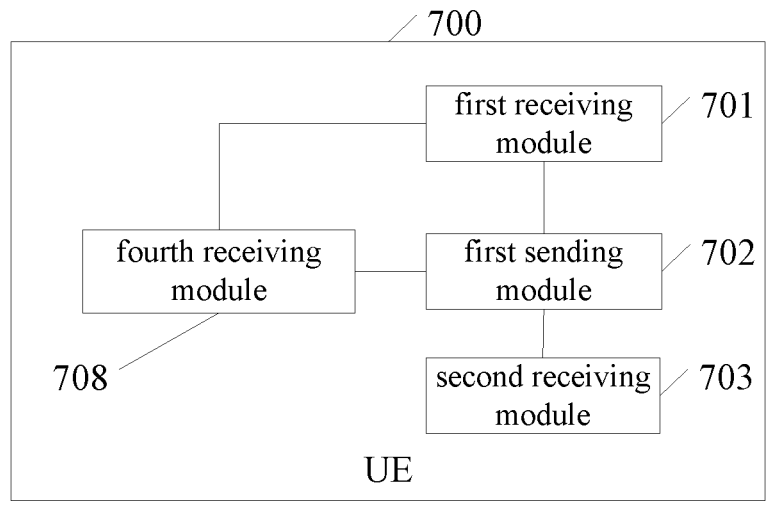
FIG. 11 is still yet another schematic view showing a user equipment according to some embodiments of the present disclosure.

As shown in FIG. 11, UE 700 further includes: a fourth receiving module 708, configured to receive a system information acquisition failure message sent by the network side device when the system information of the network side device does not include the system information required by the UE.

Figure 12:
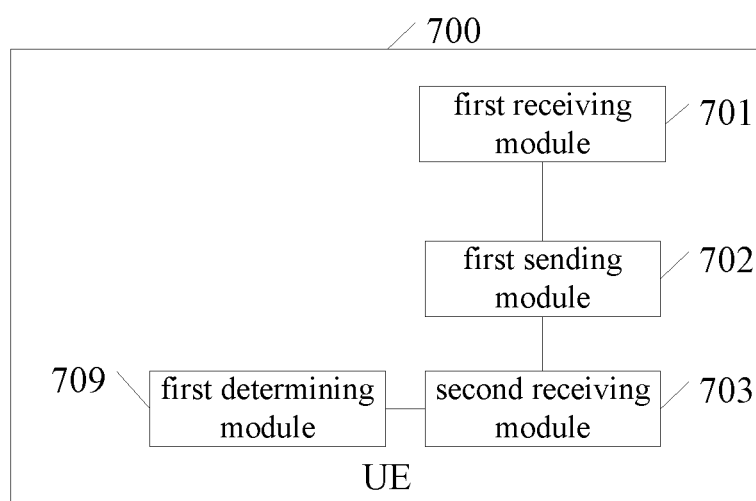
FIG. 12 is still yet another schematic view showing a user equipment according to some embodiments of the present disclosure.

Optionally, the second receiving module 703 is configured to receive a response message that is sent by the network side, where the response message includes system information required by the UE in the on-demand system information, and systemInfoValueTag;

As shown in FIG. 12, the UE 700 further includes: a first determining module 709, configured to determine whether the systemInfoValueTag is consistent with the systemInfoValueTag when the request message is sent, if yes, determine that the system information required by the UE sent by the network side device is valid, if not, determine the system information required by the UE sent by the network side device is invalid.

Figure 13:
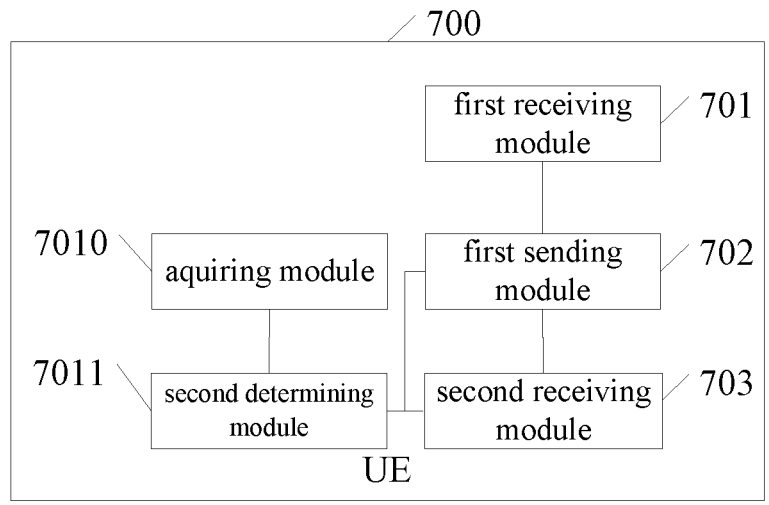
FIG. 13 is still yet another schematic view showing a user equipment according to some embodiments of the present disclosure.

Optionally, as shown in FIG. 13, the UE 700 further includes: an obtaining module 7010, configured to obtain systemInfoValueTag, where the systemInfoValueTag is a systemInfoValueTag in a system message broadcasted periodically by the network side device when the UE receives the system information required by the UE sent by the network side device; and a second determining module 7011, configured to determine whether the systemInfoValueTag is consistent with the systemInfoValueTag when the request message is sent, if yes, determine that the system information required by the UE sent by the network side device is valid, if not, determine the system information required by the UE sent by the network side device is invalid.

Optionally, the request message indicates the system information required by the UE by using a bitmap; or the request message indicates the system information required by the UE by an index.

Optionally, the first sending module 702 is configured to send the request message to the network side device in a random access procedure.

The second receiving module 703 is configured to receive system information required by the UE in the on-demand system information sent by the network side device in the random access process.

Optionally, the first sending module 702 is configured to send an uplink signal to the network side device, where the uplink signal corresponds to system information required by the UE, so that the network side device determines system information required by the UE by using the uplink signal.

Figure 14:
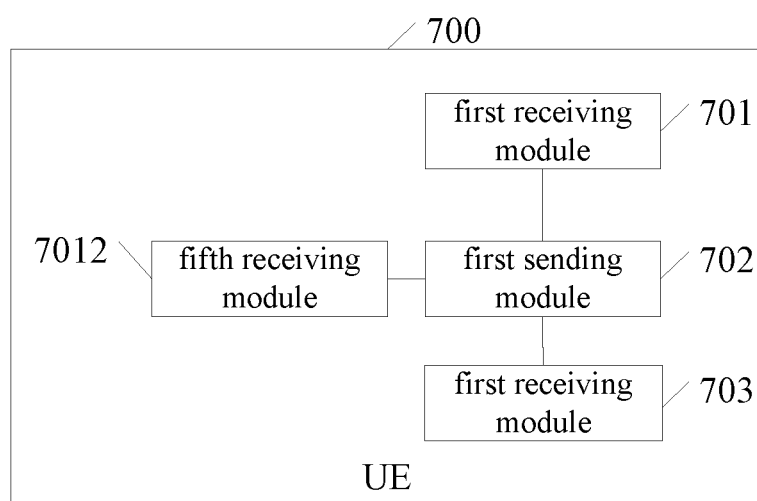
FIG. 14 is still yet another schematic view showing a user equipment according to some embodiments of the present disclosure.

Optionally, as shown in FIG. 14, the UE further includes: a fifth receiving module 7012, configured to receive the mapping relationship information between the uplink signal and the system information sent by the network side device.

Optionally, the first sending module 702 is configured to send the request message to the network side device by using an RRC message; or the first sending module 702 is configured to send the request message to the network side device by using a MAC CE.

It should be noted that, in the embodiment, UE 700 may be any UE in the method embodiments of the present disclosure, and any implementation of the UE in the method embodiment in the present disclosure may be implemented by UE 700. The same beneficial effects are achieved, and details are not described herein again.

Figure 15:
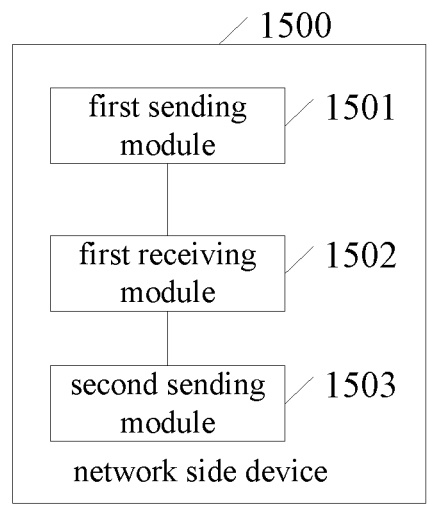
FIG. 15 is a schematic view showing a network side device according to some embodiments of the present disclosure.

FIG. 15 shows a structure of a network side device, and the network side device 1500 includes the following modules.

A first sending module 1501 is configured to send system information to the UE, where the system information is part of system information of the network side device.

A first receiving module 1502 is configured to receive a request message sent by the UE, where the request message is used to request system information required by the UE.

A second sending module 1503, configured to send, to the UE, system information required by the UE in the on-demand system information, where the on-demand system information is another part of the system information other than the part of system information of the network side device.

Optionally, the system information required by the UE is part or all of the system information indicated in the information indication list acquired by the UE, and the information indication list is an indication list of the on-demand system information.

Optionally, the first sending module 1501 is configured to send, to the UE, a system message that includes system information, where the system message further includes the information indication list.

Optionally, the first sending module 1501 is configured to send, to the UE, a system message that includes system information, where the system message further includes indication information indicating whether the network side device has the on-demand system information.

Figure 16:
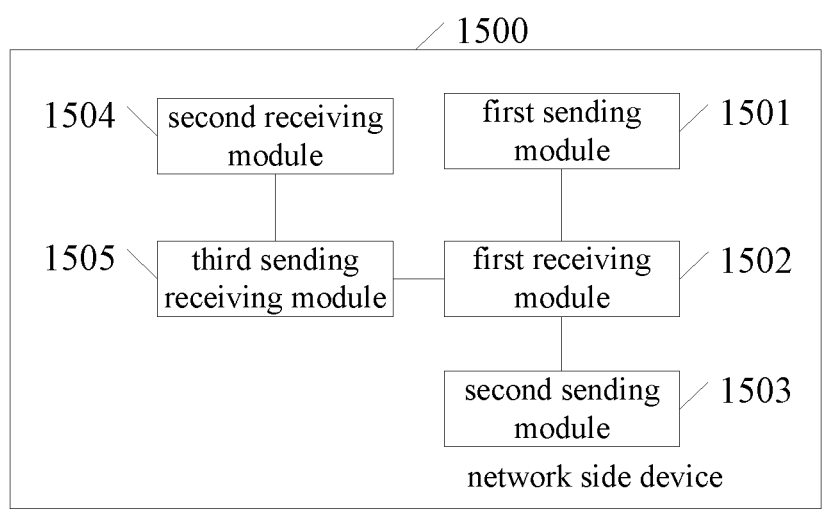
FIG. 16 is another schematic view showing a network side device according to some embodiments of the present disclosure.

Optionally, as shown in FIG. 16, the network side device 1500 further includes: a second receiving module 1504, configured to, if the indication information indicates that the network side device has the on-demand system information, receive an acquisition request message of the information indication list sent by the UE; a third sending module 1505, configured to send the information indication list to the UE.

Optionally, if the indication information indicates that the network side device has the on-demand system information, so that the UE determines system information other than the system information included in the system message as an on-demand system information. The information indication list is an indication list of the determined on-demand system information.

Optionally, the first sending module 1501 is configured to send, to the UE, a system message that includes system information, where the system message further includes indication information indicating whether the network side device has the on-demand system information, if the indication information indicates the network side device has the on-demand system information, determine, by the UE, system information other than the system information included in the system message as the on-demand system information. The system information required by the UE is part or all of the system information of the determined on-demand system information.

Optionally, the second sending module 1503 is configured to send, to the UE, a response message, where the response message includes all system information required by the UE in the on-demand system information; or the second sending module 1503 is configured to send a part of system information required by the UE in the on-demand system information, and indication information indicating that another part of system information required by the UE cannot be provided; or the second sending module 1503 is configured to send a response message to the UE in a multicast way, where the response message includes all system information required by the UE in the on-demand system information, and all system information required by other UEs in the on-demand system information; or the second sending module 1503 is configured to send a response message to the UE by using a multicast way, where the response message includes system information required by the UE in the on-demand system information, and the system information required by other UEs in the on-demand system information, and indication information indicating that part of system information cannot be provided, wherein the part of system information is part of system information requested by the request message and/or requested by the other UE; the second sending module 1503 is configured to send a response message to the UE in a multicast way, where the response message includes all system information required by the UE in the on-demand system information, and a failure indication message indicating that system information required by other UEs cannot be provided.

Optionally, the second sending module 1503 is configured to send system information required by the UE in the on-demand system information to the UE when the on-demand system information of the network side device includes the system information required by the UE.

Figure 17:
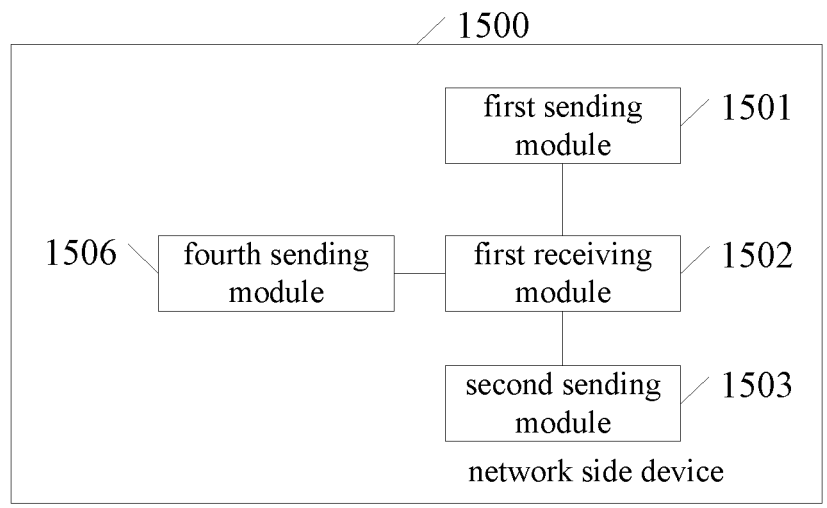
FIG. 17 is yet another schematic view showing a network side device according to some embodiments of the present disclosure.

As shown in FIG. 17, the network side device 1500 further includes: a fourth sending module 1506, configured to send an acquisition failure message of the system information to the UE when the system information of the network side device does not include the system information required by the UE.

Optionally, the second sending module 1503 is configured to send a response message to the UE, where the response message includes system information required by the UE in the on-demand system information, and a systemInfoValueTag, so that the UE determines whether the systemInfoValueTag and the systemInfoValueTag during sending the request message is consistent, if yes, determining that the system information required by the UE sent by the network side device is valid, and if not, determining that the system information required by the UE sent by the network side device is invalid.

Figure 18:
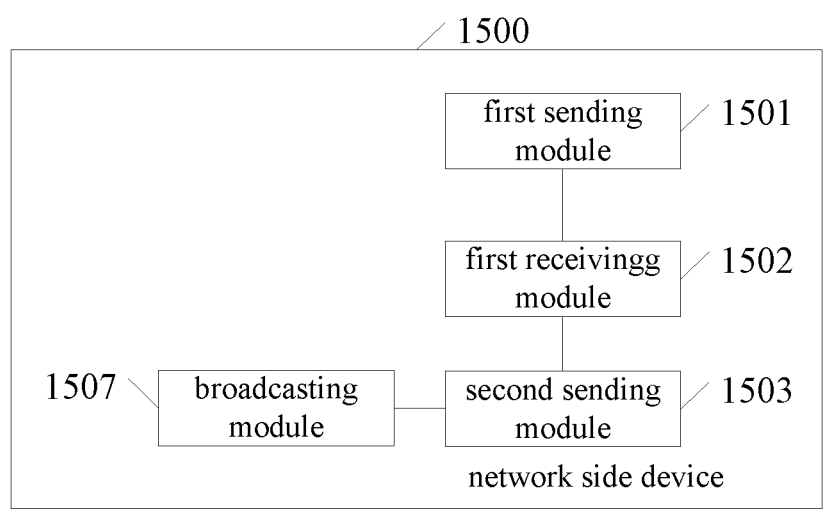
FIG. 18 is still yet another schematic view showing a network side device according to some embodiments of the present disclosure.

Optionally, as shown in FIG. 18, the network side device further includes: a broadcasting module 1507, configured to: when the system information required by the UE is sent to the UE, broadcasting a system message, where the system message includes a systemInfoValueTag, so that the UE determines whether the systemInfoValueTag and the systemInfoValueTag during sending the request message is consistent, if yes, determining that the system information required by the UE sent by the network side device is valid, and if not, determining that the system information required by the UE sent by the network side device is invalid.

Optionally, the request message indicates system information required by the UE by using a bitmap; or the request message indicates the system information required by the UE by an index.

Optionally, the first receiving module 1502 is configured to receive the request message sent by the UE in a random access procedure; the second sending module 1503 is configured to send system information required by the UE in the on-demand system information to the UE in the random access procedure.

Optionally, the first receiving module 1502 is configured to receive an uplink signal sent by the UE, where the uplink signal corresponds to system information required by the UE.

Figure 19:
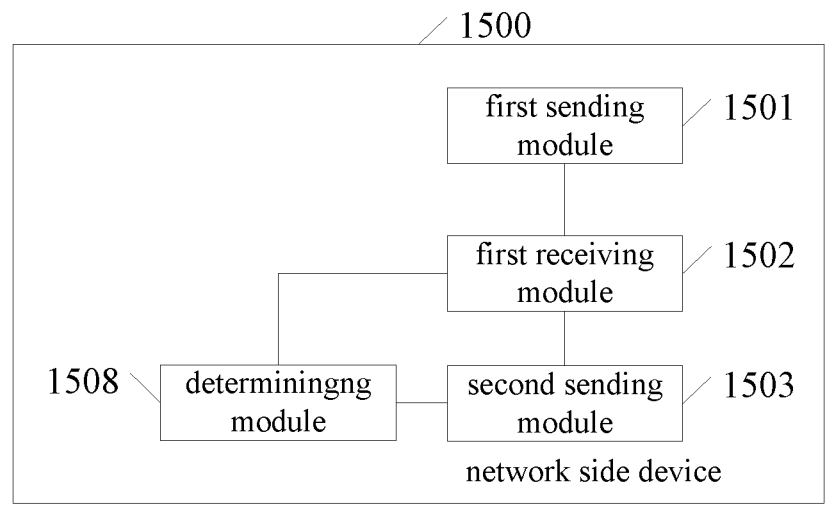
FIG. 19 is still yet another schematic view showing a network side device according to some embodiments of the present disclosure.

As shown in FIG. 19, the network side device 1500 further includes: a determining module 1508, configured to determine system information required by the UE by using the uplink signal.

Figure 20:
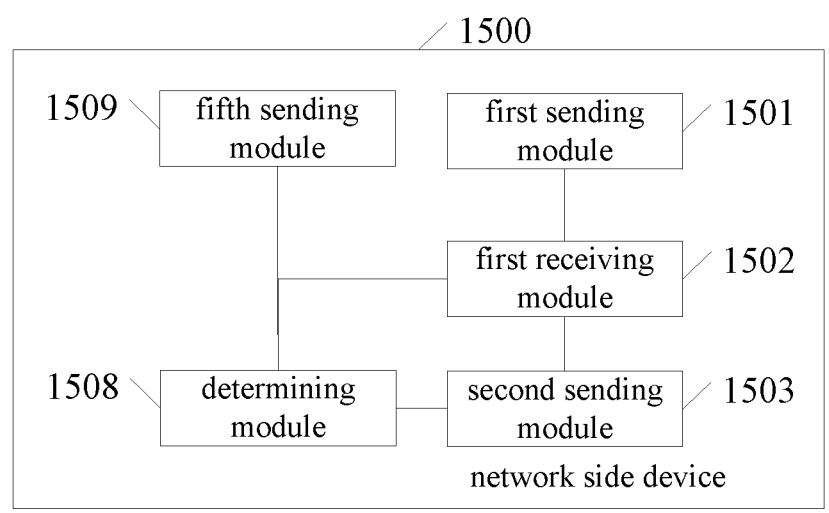
FIG. 20 is still yet another schematic view showing a network side device according to some embodiments of the present disclosure.

Optionally, as shown in FIG. 20, the network side device 1500 further includes: a fifth sending module 1509, configured to send mapping relationship information between the uplink signal and the system information to the UE.

Optionally, the first receiving module 1502 is configured to receive the request message sent by the UE by using an RRC message; or the first receiving module 1502 is configured to receive the request message sent by the UE by using a MAC CE.

It should be noted that, in the embodiment, the network side device 1500 may be the network side device in any of the method embodiments in the present disclosure, and any implementation of the network side device in the method embodiments of the present disclosure may be implemented by the above network side device 1500 in this embodiment, and the same beneficial effects are achieved, and details are not described herein again.

Figure 21:
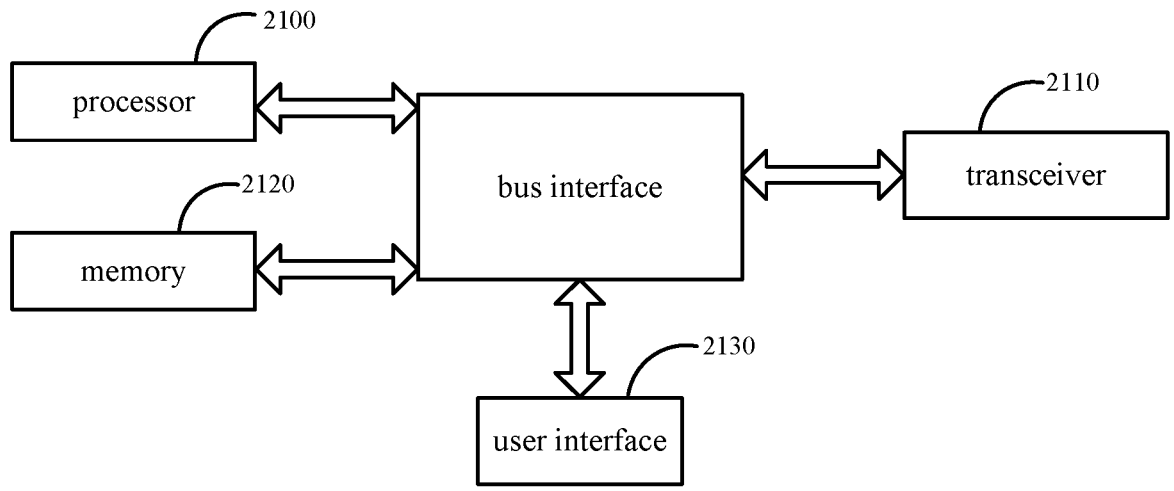
FIG. 21 is still yet another schematic view showing a user equipment according to some embodiments of the present disclosure.

FIG. 21 shows a structure of a UE. The UE includes: a processor 2100, a transceiver 2110, a memory 2120, a user interface 2130, and a bus interface.

The processor 2100 is configured to read a program in the memory 2120 and perform the following process: receiving, by the transceiver 2110, system information sent by the network side device, where the system information is part of system information of the network side device; sending, by the transceiver 2110, a request message to the network side device, where the request message is used to request system information required by the UE; receiving, by the transceiver 2110, system information required by the UE in the on-demand system information sent by the network side, where the on-demand system information is another part of the system information of the network side device other than the part of system information.

The transceiver 2110 is configured to receive and transmit data under the control of the processor 2100.

In FIG. 21, the bus architecture can include any quantity of buses and bridges specifically connected by various circuits including one or more processors represented by processor 2100 and a memory represented by memory 2120. The bus architecture can also link various other circuits, such as peripherals, voltage regulators, and power management circuits together. Those are well known in the art and will not be further described herein. The bus interface provides an interface. Transceiver 2110 can be a plurality of components, including a transmitter and a receiver, so as to provide means for communicating with various other devices on a transmission medium. For different UEs, the user interface 2130 may also be used to connect external or internal devices, which include but not limited to a keypad, a display, a speaker, a microphone, a joystick, and the like.

The processor 2100 is configured to manage the bus architecture and general processing, and the memory 2120 can store data used by the processor 2100 when performing operations.

Optionally, the system information required by the UE is a part or all of the system information indicated in the information indication list acquired by the UE, and the information indication list is an indication list of the on-demand system information.

Optionally, the system information sent by the receiving network side device includes: receiving a system message that is sent by the network side device, and includes system information, where the system message further includes the information indication list.

Optionally, the receiving system information sent by the network side device includes: receiving a system message that includes system information sent by the network side device, where the system message further includes indication information about whether the network side device has the on-demand system information.

Optionally, the processor 2100 is further configured to: if the indication information indicates that the network side device has the on-demand system information, send a request message for obtaining the information request list to the network side device by the transceiver 2110; receive the information indication list sent by the network side device by the transceiver 2110.

Optionally, the processor 2100 is further configured to:

If the indication information indicates that the network side device has the on-demand system information, determine system information other than the system information included in the system message as the on-demand system information. The information indication list is an indication list of the determined on-demand system information.

Optionally, the receiving system information sent by the network side device includes: receiving a system message that includes system information sent by the network side device, where the system message further includes indication information about whether the network side device has the on-demand system information.

The processor 2100 is also used to: if the indication information indicates that the network side device has the on-demand system information, determine system information other than the system information included in the system message as the on-demand system information. The system information required by the UE is part or all of the system information of the determined on-demand system information.

Optionally, the receiving the system information required by the UE in the on-demand system information sent by the network side, includes: receiving a response message sent by the network side, where the response message includes all system information required by the UE in the on-demand system information; or receiving a response message sent by the network side, where the response message includes a part of system information required by the UE in the on-demand system information, and indication information indicating that another part of the system information required by the UE cannot be provided; or receiving a response message sent by the network side in a multicast way, where the response message includes all system information required by the UE in the on-demand system information, and all system information required by other UEs in the on-demand system information; or receiving a response message sent by the network side, where the response message includes system information required by the UE in the on-demand system information, and system information required by other UEs in the on-demand system information, and indication information indicating that part of system information cannot be provided, wherein the part of system information is part of system information requested by the request message and/or requested by the other UEs; or receiving a response message sent by the network side in a multicast way, where the response message includes all system information required by the UE in the on-demand system information, and a failure indication information indicating that system information required by other UEs cannot be provided.

Optionally, the receiving the system information required by the UE in the on-demand system information sent by the network side, includes: receiving system information required by the UE in the on-demand system information sent by the network side when the on-demand system information of the network side device includes the system information required by the UE. The processor 2100 is also used to: receive, by the transceiver 2110, a system information acquisition failure message sent by the network side device when the system information of the network side device does not include the system information required by the UE.

Optionally, the receiving the system information required by the UE in the on-demand system information sent by the network side, includes: receiving a response message sent by the network side, where the response message includes system information required by the UE in the on-demand system information, and systemInfoValueTag.

The processor 2100 is also used to determine whether the systemInfoValueTag is consistent with the systemInfoValueTag when the request message is sent, if yes, determine that the system information required by the UE sent by the network side device is valid, if not, determine the system information required by the UE sent by the network side device is invalid.

Optionally, the processor 2100 is further configured to obtain the systemInfoValueTag by the transceiver 2110, where the systemInfoValueTag is a systemInfoValueTag in a system message broadcasted periodically by the network side device when the UE receives the system information required by the UE sent by the network side device; and determine whether the systemInfoValueTag is consistent with the systemInfoValueTag when the request message is sent, if yes, determine that the system information required by the UE sent by the network side device is valid, if not, determine the system information required by the UE sent by the network side device is invalid.

Optionally, the request message indicates the system information required by the UE by using a bitmap; or the request message indicates the system information required by the UE by an index.

Optionally, the sending the request message to the network side device includes: sending the request message to the network side device in a random access procedure.

The receiving the system information required by the UE in the on-demand system information sent by the network side, includes: receiving system information required by the UE in the on-demand system information sent by the network side device in the random access procedure.

Optionally, the sending the request message to the network side device includes: sending an uplink signal to the network side device, where the uplink signal corresponds to system information required by the UE, so that the network side device determines system information required by the UE by using the uplink signal.

Optionally, the processor 2100 is further configured to receive mapping relationship information between the uplink signal and the system information sent by the network side device.

Optionally, the sending the request message to the network side device includes: sending the request message to the network side device by using an RRC message; or sending the request message to the network side device by using a MAC CE.

It should be noted that, in the embodiment, UE may be any UE in the method embodiments of the present disclosure, and any implementation of the UE in the method embodiment in the present disclosure may be implemented by UE. The same beneficial effects are achieved, and details are not described herein again.

Figure 22:
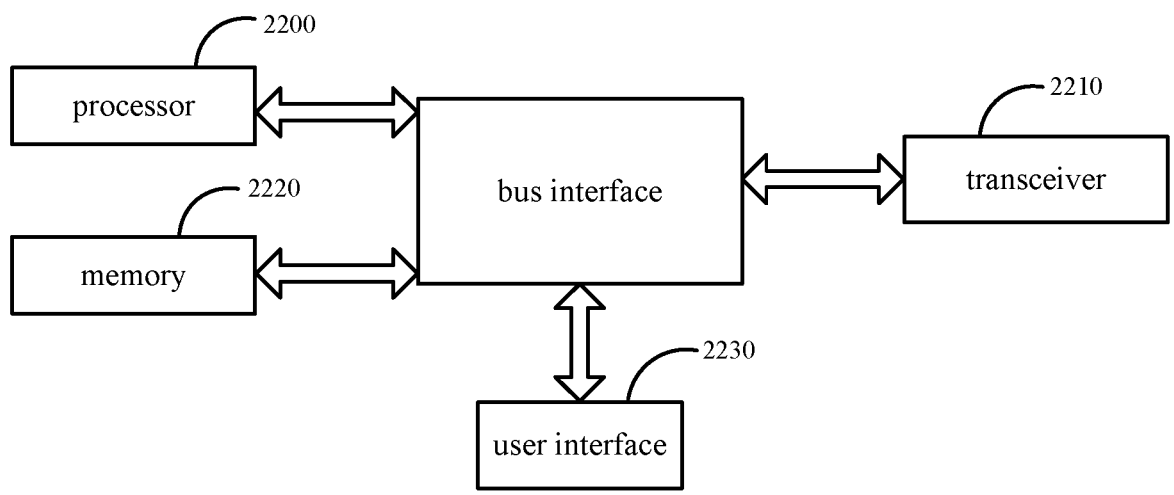
FIG. 22 is still yet another schematic view showing a network side device according to some embodiments of the present disclosure.

FIG. 22 shows a structure of a network side device including a processor 2200, a transceiver 2210, a memory 2220, a user interface 2230, and a bus interface.

The processor 2200 is configured to read a program in the memory 2220 and perform the following steps: sending, by the transceiver 2210, system information to the UE, where the system information is part of system information of the network side device; receiving, by the transceiver 2210, a request message sent by the UE, where the request message is used to request system information required by the UE; sending, by the transceiver 2210, system information required by the UE in the required system information to the UE, where the on-demand system information is another part of the system information other than the part of system information of the network side device.

The transceiver 2210 is configured to receive and send data under the control of the processor 2200.

In FIG. 22, the bus architecture may include any quantity of buses and bridges connect by various circuits including one or more processors represented by processor 2200 and a memory represented by memory 2220. The bus architecture can also link various other circuits, such as peripherals, voltage regulators, and power management circuits. Those are well known in the art and, and will not be further described herein. The bus interface provides an interface. Transceiver 2210 may be a plurality of components, including a transmitter and a receiver, so as to provide means for communicating with various other devices on a transmission medium. For different user equipment, the user interface 2230 may also be an interface connected to external or internal devices, including but not limited to a keypad, a display, a speaker, a microphone, a joystick, and the like.

The processor 2200 is configured to manage the bus architecture and general processing, and the memory 2220 can store data used by the processor 2200 when performing operations.

Optionally, the system information required by the UE is a part or all of the system information indicated in the information indication list acquired by the UE and the information indication list is an indication list of the on-demand system information.

Optionally, the sending the system information to the UE includes: sending a system message including system information to the UE, the system message further including the information indication list.

Optionally, the sending the system information to the UE includes: sending, to the UE, a system message including system information, where the system message further includes indication information about whether the network side device has the on-demand system information.

Optionally, the processor 2200 is further configured to: if the indication information indicates that the network side device has the on-demand system information, receive, by the transceiver 2210, the acquisition request message of the information indication list sent by the UE; send the information indication list to the UE by the transceiver 2210.

Optionally, if the indication information indicates that the network side device has the on-demand system information, so that the UE determines system information other than the system information included in the system message as an on-demand system. Information. The information indication list is an indication list of the determined on-demand system information.

Optionally, the sending the system information to the UE includes: sending, to the UE, a system message including system information, where the system message further includes indication information indicating whether the network side device has the on-demand system information, if the indication information indicates the network side device has the on-demand system information, determine, by the UE, system information other than the system information included in the system message as the on-demand system information. The system information required by the UE is part or all of the system information of the determined on-demand system information.

Optionally, the sending the system information required by the UE in the system information of the on-demand to the UE, includes: sending, to the UE, a response message, where the response message includes all system information required by the UE in the on-demand system information; or sending, to the UE, a part of system information required by the UE in the on-demand system information, and indication information indicating that another part of system information required by the UE cannot be provided; or sending a response message to the UE in a multicast way, where the response message includes all system information required by the UE in the on-demand system information, and all system information required by other UEs in the on-demand system information; or sending a response message to the UE by using a multicast way, where the response message includes system information required by the UE in the on-demand system information, and the system information required by other UEs in the on-demand system information, and indication information indicating that part of system information cannot be provided, wherein the part of system information is part of system information requested by the request message and/or requested by the other UE; or sending a response message to the UE in a multicast way, where the response message includes all system information required by the UE in the on-demand system information, and a failure indication message indicating that system information required by other UEs cannot be provided.

Optionally, the sending the system information required by the UE in the system information of the on-demand to the UE, includes: send system information required by the UE in the on-demand system information to the UE when the on-demand system information of the network side device includes the system information required by the UE.

The processor 2200 is also used to: send an acquisition failure message of the system information to the UE when the system information of the network side device does not include the system information required by the UE.

Optionally, the sending the system information required by the UE in the system information of the on-demand to the UE, includes: sending a response message to the UE, where the response message includes system information required by the UE in the on-demand system information, and a systemInfoValueTag, so that the UE determines whether the systemInfoValueTag and the systemInfoValueTag during sending the request message is consistent, if yes, determining that the system information required by the UE sent by the network side device is valid, and if not, determining that the system information required by the UE sent by the network side device is invalid.

Optionally, the processor 2200 is further configured to, when the system information required by the UE is sent to the UE, broadcast a system message, where the system message includes a systemInfoValueTag, so that the UE determines whether the systemInfoValueTag and the systemInfoValueTag during sending the request message is consistent, if yes, determining that the system information required by the UE sent by the network side device is valid, and if not, determining that the system information required by the UE sent by the network side device is invalid.

Optionally, the request message indicates system information required by the UE by using a bitmap; or the request message indicates the system information required by the UE by an index.

Optionally, the receiving the request message sent by the UE includes: receiving, by the UE, the request message sent in a random access procedure.

The sending, to the UE, the system information required by the UE in the system information of the on-demand, includes: sending system information required by the UE in the on-demand system information to the UE in the random access procedure.

Optionally, the receiving the request message sent by the UE includes: receiving an uplink signal sent by the UE, where the uplink signal corresponds to system information required by the UE.

The processor 2200 is also used to: determine system information required by the UE by using the uplink signal.

Optionally, the processor 2200 is further configured to send mapping relationship information between the uplink signal and the system information to the UE.

Optionally, the receiving the request message sent by the UE includes: receiving the request message sent by the UE by using an RRC message; or receiving the request message sent by the UE by using a MAC CE.

It should be noted that, in the embodiment, the network side device may be the network side device in any of the method embodiments in the present disclosure, and any implementation of the network side device in the method embodiments of the present disclosure may be implemented by the above network side device in this embodiment, and the same beneficial effects are achieved, and details are not described herein again.

Figure 23:
FIG. 23 is a schematic view showing a system information transmission system according to some embodiments of the present disclosure.

FIG. 23 shows a structure of a system for transmitting system information.

The network side device 2301 is configured to send system information to the UE 2302, where the system information is part of system information of the network side device. The UE 2301 is configured to receive the system information sent by the network side device 2302. The UE 2301 further sends a request message to the network side device 2302, where the request message is used to request system information required by the UE 2301. The network side device 2301 is further configured to receive the request message sent by the UE 2302, and send the system information required by the UE 2302 in the on-demand system information to the UE 2302, where the on-demand system information is another part of the system information of the network side device 2301 other than the part of system information. The UE 2302 further receives system information required by the UE 2302 in the on-demand system information sent by the network side.

In this embodiment, the network side device 2301 and the UE 2302 may be the network side device and the UE in the embodiments shown in FIG. 1 to FIG. 22, and has the implementation similar with FIG. 1 to FIG. 22. The same technical effect is achieved and will not be described here.

In some embodiments of the present disclosure, it should be understood that the disclosed method and apparatus may be implemented in other manners. For example, the device embodiments described above are merely illustrative. For example, the division of the unit is only a logical function division. In actual implementation, there may be other division manners, for example, multiple units or components may be combined or integrated into another system, or some features can be omitted or not executed. In addition, the coupling or direct coupling or communication connection shown or discussed herein may be an indirect coupling or communication connection through some interface, device or unit, and may be electrical, mechanical or any other connection.

In addition, each functional unit in various embodiments of the present disclosure may be integrated into one processing unit, or each unit may be physically included, or two or more units may be integrated into one unit. The above integrated unit can be implemented in the form of hardware or in the form of hardware and software functional units.

The above-described integrated unit implemented in the form of a software functional unit can be stored in a computer readable storage medium. The above software functional unit is stored in a storage medium and includes a plurality of instructions for causing one computer device (which may be a personal computer, a server, or a network device, etc.) to perform part of steps of the transmitting and receiving method. The storage medium includes: a U disk, a mobile hard disk, a read-only memory (ROM), a random access memory (RAM), a magnetic disk, or an optical disk, and the like.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A transmission method of system information, comprising:

receiving, by a user equipment (UE), a first part of system information of a network side device and indication information sent by the network side device, wherein the indication information is about whether the network side device has on-demand system information, and the on-demand system information is a second part of the system information of the network side device, the first part of the system information of the network side device and the indication information sent by the network side device are comprised in a system message, and the system message further comprises an information indication list, the information indication list is an indication list of the on-demand system information;

sending, by the UE, a request message to the network side device, wherein the request message is used to request system information required by the UE in the on-demand system information, the system information required by UE is part or all of system information indicated in the information indication list; and receiving, by the UE, the system information, required by the UE, sent by the network side device, wherein the receiving, by the UE, the system information, required by the UE, sent by the network side device comprises:

receiving, by the UE, a response message sent by the network side, wherein the response message comprises part of system information required by the UE in the on-demand system information and indication information indicating that the other part of system information required by the UE cannot be provided; or receiving, by the UE, a response message sent by the network side in a multicast way, wherein the response message comprises system information required by the UE in the on-demand system information, system information required by other UEs in the on-demand system information, and indication information indicating that part of system information cannot be provided, wherein the part of system information is part of system information requested by the request message and/or requested by the other UEs; or receiving, by the UE, a response message sent by the network side in a multicast way, wherein the response message comprises all system information required by the UE in the on-demand system information, and a failure indication information indicating that system information required by other UEs cannot be provided.

2. The method according to claim 1,
further comprising:
receiving, by the UE, a system information acquisition failure message sent by the network side device when the on-demand system information of the network side device does not include the system information required by the UE.

3. The method according to claim 2, wherein
in a case that the response message comprises the system information required by the UE in the on-demand system information or in a case that the response message comprises part of system information required by the UE in the on-demand system information, the response message further comprises a system information value tag (systemInfoValueTag); and wherein the method further comprises:
determining, by the UE, whether the systemInfoValueTag is consistent with systemInfoValueTag when the request message is sent, if yes, determine that the system information, required by the UE, sent by the network side device is valid, if not, determine the system information, required by the UE, sent by the network side device is invalid.

4. The method according to claim 1, further comprising:
obtaining, by the UE, systemInfoValueTag, wherein the systemInfoValueTag is a systemInfoValueTag in a system message broadcasted periodically by the network side device when the UE receives the system information, required by the UE, sent by the network side device; and determining, by the UE, whether the systemInfoValueTag is consistent with systemInfoValueTag when the request message is sent, if yes, determine that the system information, required by the UE, sent by the network side device is valid, if not, determine the system information, required by the UE, sent by the network side device is invalid.

5. The method according to claim 1, wherein the request message indicates the system information required by the UE by using a bitmap; or the request message indicates system information required by the UE by an index.

6. The method according to claim 1, wherein the sending, by the UE, the request message to the network side device comprises:
sending, by the UE, the request message to the network side device in a random access procedure; and
the receiving by the UE, the system information, required by the UE, sent by the network side device comprises:
receiving, by the UE, the system information, required by the UE, sent by the network side device in the random access procedure.

7. The method according to claim 1, wherein the sending, by the UE, the request message to the network side device comprises:
sending, by the UE, an uplink signal to the network side device, wherein the uplink signal corresponds to the system information required by the UE, so that the network side device determines the system information required by the UE by using the uplink signal.

8. The method according to claim 7, further comprising:
receiving, by the UE, mapping relationship information between the uplink signal and the system information sent by the network side device.

9. The method according to claim 1, wherein the sending, by the UE, the request message to the network side device comprises:
sending, by the UE, the request message to the network side device by using a radio resource control message; or
sending, by the UE, the request message to the network side device by using a MAC control element.

10. A transmission method of system information, comprising:
sending, by a network side device, a first part of system information of a network side device and indication information to a user equipment (UE), wherein the indication information is about whether the network side device has on-demand system information, and the on-demand system information is a second part of the system information of the network side device, the first part of the system information of the network side device and the indication information are comprised in a system message, and the system message further comprises an information indication list, the information indication list is an indication list of the on-demand system information;

receiving, by the network side device, a request message sent by the UE, wherein the request message is used to request system information required by the UE in the on-demand system information, wherein the system information required by UE is part or all of system information indicated in the information indication list; and sending, by the network side device, the system information required by the UE in the on-demand system information to the UE, wherein sending, by the network side device, the system information required by the UE in the on-demand system information to the UE comprises:

sending, by the network side device, a response message to the UE, wherein the response message comprises part of system information required by the UE in the on-demand system information, and indication information indicating that the other part of system information required by the UE cannot be provided; or, sending, by the network side device, a response message to the UE in a multicast way, wherein the response message comprises system information required by the UE in the on-demand system information, the system information required by other UEs in the on-demand system information, and indication information indicating that part of system information cannot be provided, wherein the part of system information is part of system information requested by the request message and/or requested by the other UE; or, sending, by the network side device, a response message to the UE in a multicast way, wherein the response message comprises all system information required by the UE in the on-demand system information, and a failure indication message indicating that system information required by other UEs cannot be provided.

11. A user equipment (UE), comprising:
a processor; and
a transceiver, connected with the processor and configured to transmit and receive data under the control of the processor,
wherein the processor is configured for:
receiving a first part of system information of a network side device and indication information sent by the network side device, wherein the indication information is about whether the network side device has on-demand system information, and the on-demand system information is a second part of the system information of the network side device, and the first part of the system information is different from the second part of the system information, the first part of the system information of the network side device and the indication information sent by the network side device are comprised in a system message, and the system message further comprises an information indication list, the information indication list is an indication list of the on-demand system information;

sending a request message to the network side device, wherein the request message is used to request system information required by the UE in the on-demand system information, the system information required by UE is part or all of system information indicated in the information indication list; and receiving the system information, required by the UE, sent by the network side device, wherein receiving the system information, required by the UE, sent by the network side device comprises:

receiving a response message sent by the network side, wherein the response message comprises part of system information required by the UE in the on-demand system information and indication information indicating that the other part of system information required by the UE cannot be provided; or receiving a response message sent by the network side in a multicast way, wherein the response message comprises system information required by the UE in the on-demand system information, system information required by other UEs in the on-demand system information, and indication information indicating that part of system information cannot be provided, wherein the part of system information is part of system information requested by the request message and/or requested by the other UEs; or receiving a response message sent by the network side in a multicast way, wherein the response message comprises all system information required by the UE in the on-demand system information, and a failure indication information indicating that system information required by other UEs cannot be provided.

12. A network side device, comprising:
a processor; and
a transceiver, connected with the processor and configured to transmit and receive data under the control of the processor,
wherein the processor is configured for:
sending a first part of system information of the network side device and indication information to a user equipment (UE), wherein the indication information is about whether the network side device has on-demand system information, and the on-demand system information is a second part of the system information of the network side device, the first part of the system information of the network side device and the indication information are comprised in a system message, and the system message further comprises an information indication list, the information indication list is an indication list of the on-demand system information;

receiving a request message sent by the UE, wherein the request message is used to request system information required by the UE in the on-demand system information, wherein the system information required by UE is part or all of system information indicated in the information indication list; and sending the system information required by the UE in the on-demand system information to the UE, wherein sending the system information required by the UE in the on-demand system information to the UE, comprises:

sending a response message to the UE, wherein the response message comprises part of system information required by the UE in the on-demand system information, and indication information indicating that the other part of system information required by the UE cannot be provided; or, sending a response message to the UE in a multicast way, wherein the response message comprises system information required by the UE in the on-demand system information, the system information required by other UEs in the on-demand system information, and indication information indicating that part of system information cannot be provided, wherein the part of system information is part of system information requested by the request message and/or requested by the other UE; or, sending a response message to the UE in a multicast way, wherein the response message comprises all system information required by the UE in the on-demand system information, and a failure indication message indicating that system information required by other UEs cannot be provided.

\* \* \* \* \*